US012671467B2

(12) United States Patent
Duan et al.

(10) Patent No.: US 12,671,467 B2
(45) Date of Patent: Jun. 30, 2026

(54) METHOD AND APPARATUS FOR MULTIPLE-INPUT MULTIPLE-OUTPUT (MIMO) RADAR SENSING WITH RECONFIGURABLE INTELLIGENT SURFACE (RIS)

(71) Applicant: QUALCOMM Incorporated, San Diego, CA (US)

(72) Inventors: Weimin Duan, San Diego, CA (US); Hyojin Lee, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 18/796,126

(22) Filed: Aug. 6, 2024

(65) Prior Publication Data

US 2024/0405810 A1 Dec. 5, 2024

Related U.S. Application Data

(62) Division of application No. 17/816,622, filed on Aug. 1, 2022, now Pat. No. 12,081,291.

(51) Int. Cl.
*H04B 7/0413* (2017.01)
*H04B 7/155* (2006.01)

(52) U.S. Cl.
CPC ........... *H04B 7/0413* (2013.01); *H04B 7/155* (2013.01)

(58) Field of Classification Search
CPC ... H04B 7/04013; H04B 7/0413; H04B 7/155
See application file for complete search history.

(56) References Cited

U.S. PATENT DOCUMENTS

2021/0384958 A1* 12/2021 Denis ..................... H04B 7/145
2023/0208479 A1 6/2023 Wang et al.
2024/0039584 A1 2/2024 Duan et al.

FOREIGN PATENT DOCUMENTS

WO 2022133952 A1 6/2022

OTHER PUBLICATIONS

Buzzi S., et al., "Exploiting Reconfigurable Intelligent Surfaces in MIMO Radar Detection", 2022 IEEE Radar Conference, IEEE, Mar. 21, 2022, 6 Pages, XP034118562, DOI: 10.1109/RADARCONF2248738.2022.9764191, Title, paragraph [03.3], figure 1.

(Continued)

*Primary Examiner* — Rahel Guarino
(74) *Attorney, Agent, or Firm* — QUALCOMM Incorporated

(57) ABSTRACT

Some aspects described include of methods operating a wireless node, the wireless node and non-transitory computer-readable medium. In some aspects, the method may include determining a first configuration associated with a first group of reconfigurable intelligence surfaces (RIS's), each RIS of the first group of RIS's being configured based on the first configuration for enabling a respective signal path from the wireless node toward a first target area. In addition, the method may include transmitting or receiving a first plurality of signals, to or from the first target area, via the first group of RIS's in accordance with the first configuration.

20 Claims, 17 Drawing Sheets

1100

Start

Determine a first configuration associated with a first group of reconfigurable intelligence surfaces (RIS's), each RIS of the first group of RIS's being configured based on the first configuration for enabling a respective signal path from the wireless node toward a first target area — 1110

Transmit or receive a first plurality of signals, to or from the first target area, via the first group of RIS's in accordance with the first configuration. — 1120

(56) References Cited

OTHER PUBLICATIONS

Cisija E., et al., "Ris-Aided MMwave MIMO Radar System for Adaptive Multi-Target Localization", 2021 IEEE Statistical Signal Processing Workshop (SSP), Jul. 11, 2021, pp. 196-200, XP033962245, DOI: 10.1109/SSP49050.2021.9513781, The whole document.
International Search Report and Written Opinion—PCT/US2023/023466—ISA/EPO—Sep. 22, 2023.
ZTE Communications: "Special Topic: Reconfigurable Intelligent Surface (RIS) Transmitter Receiver", Jan. 1, 2022, 88 Pages, XP093019537, Title, p. 15-18, Figure 2.

* cited by examiner

200

306

390

Network
Transceiver(s)

Sensing
Component ⎯ 398

Data Bus ⎯ 392

Memory

Sensing
Component

Sensing
Component

Processor(s)

Sensing
Component ⎯ 394

396        398              398              398

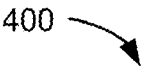
400
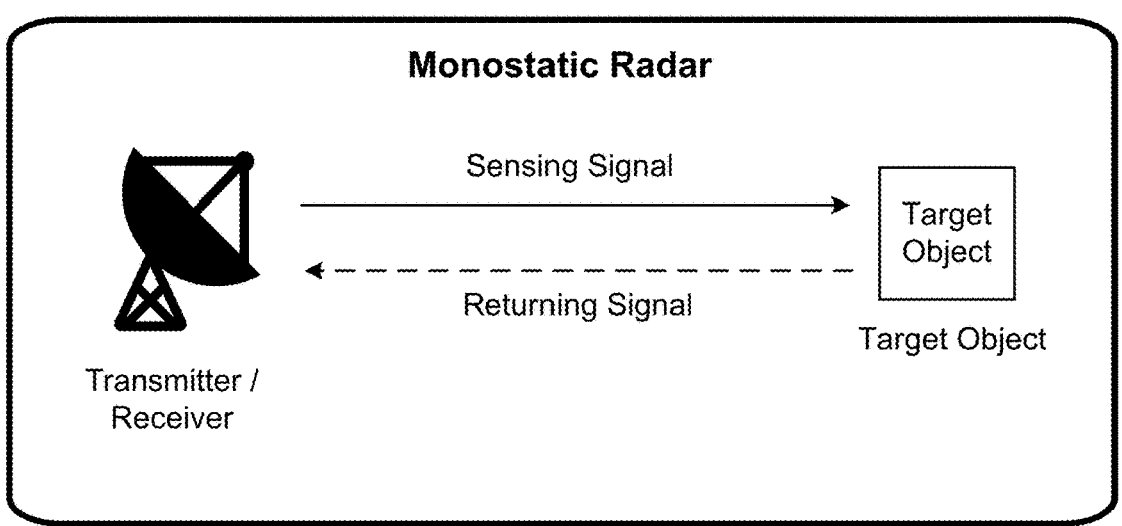
Monostatic Radar
Sensing Signal
Returning Signal
Transmitter / Receiver
Target Object
Target Object
FIG. 4A
430
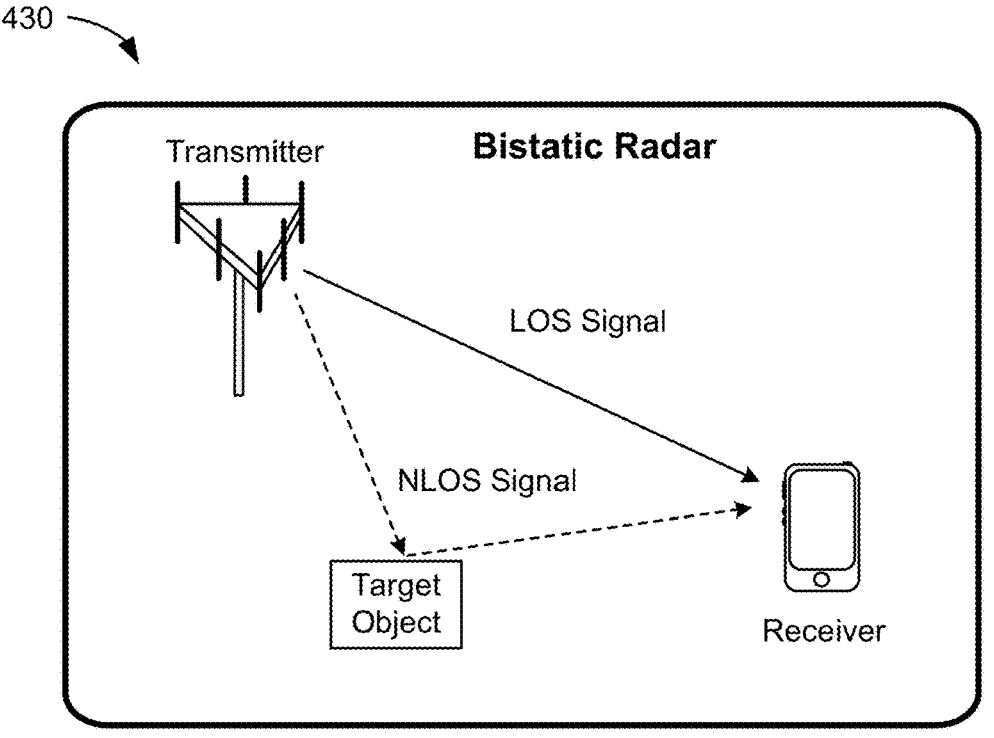
Transmitter
Bistatic Radar
LOS Signal
NLOS Signal
Target Object
Receiver
FIG. 4B

700

710

714

712

716

Controller          720

800

Start

Determine a sub-panel configuration associated with a reconfigurable intelligence surface (RIS) that includes a plurality of sub-panels          810

Transmit or receive one or more signals via one or more sub-panels of the plurality of sub-panels in accordance with the sub-panel configuration.          820

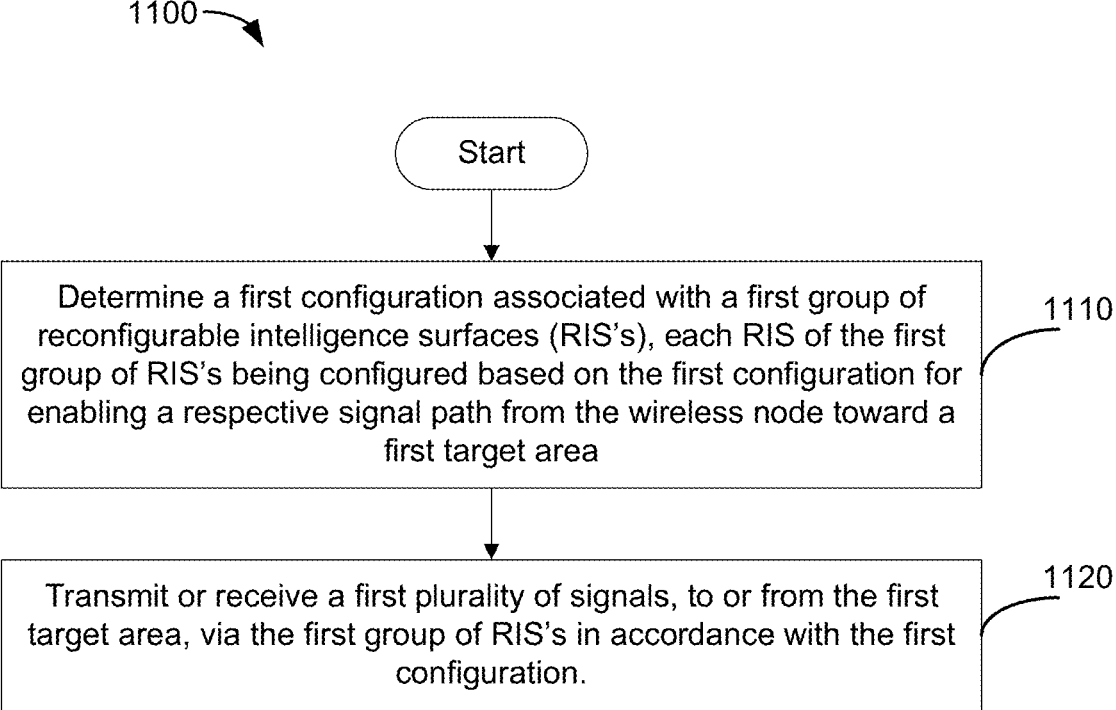

1100

Start

Determine a first configuration associated with a first group of
reconfigurable intelligence surfaces (RIS's), each RIS of the first
group of RIS's being configured based on the first configuration for
enabling a respective signal path from the wireless node toward a
first target area                                                    1110

Transmit or receive a first plurality of signals, to or from the first
target area, via the first group of RIS's in accordance with the first
configuration.                                                        1120

*FIG. 11*

1200
(Time Period T1)

1200
(Time Period T2)

METHOD AND APPARATUS FOR MULTIPLE-INPUT MULTIPLE-OUTPUT (MIMO) RADAR SENSING WITH RECONFIGURABLE INTELLIGENT SURFACE (RIS)

CROSS-REFERENCE TO RELATED APPLICATION

The present Application for Patent is a Divisional Application of U.S. application Ser. No. 17/816,622, filed Aug. 1, 2022, entitled "METHOD AND APPARATUS FOR MULTIPLE-INPUT MULTIPLE-OUTPUT (MIMO) RADAR SENSING WITH RECONFIGURABLE INTELLIGENT SURFACE (RIS)," which is assigned to the assignee hereof and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a wireless node includes determining a sub-panel configuration associated with a reconfigurable intelligence surface (RIS) that includes a plurality of sub-panels; and transmitting or receiving one or more signals via one or more sub-panels of the plurality of sub-panels in accordance with the sub-panel configuration.

In an aspect, a method of operating a wireless node includes determining a first configuration associated with a first group of reconfigurable intelligence surfaces (RIS's), each RIS of the first group of RIS's being configured based on the first configuration for enabling a respective signal path from the wireless node toward a first target area; and transmitting or receiving a first plurality of signals, to or from the first target area, via the first group of RIS's in accordance with the first configuration.

In an aspect, a wireless node includes a memory; at least one transceiver; and at least one processor communicatively coupled to the memory and the at least one transceiver, the at least one processor configured to: determine a sub-panel configuration associated with a reconfigurable intelligence surface (RIS) that includes a plurality of sub-panels; and transmit or receive, via the at least one transceiver, one or more signals via one or more sub-panels of the plurality of sub-panels in accordance with the sub-panel configuration.

In an aspect, a wireless node includes a memory; at least one transceiver; and at least one processor communicatively coupled to the memory and the at least one transceiver, the at least one processor configured to: determine a first configuration associated with a first group of reconfigurable intelligence surfaces (RIS's), each RIS of the first group of RIS's being configured based on the first configuration for enabling a respective signal path from the wireless node toward a first target area; and transmit or receive, via the at least one transceiver, a first plurality of signals, to or from the first target area, via the first group of RIS's in accordance with the first configuration.

In an aspect, a wireless node includes means for determining a sub-panel configuration associated with a reconfigurable intelligence surface (RIS) that includes a plurality of sub-panels; and means for transmitting or receiving one or more signals via one or more sub-panels of the plurality of sub-panels in accordance with the sub-panel configuration.

In an aspect, a wireless node includes means for determining a first configuration associated with a first group of reconfigurable intelligence surfaces (RIS's), each RIS of the first group of RIS's being configured based on the first configuration for enabling a respective signal path from the wireless node toward a first target area; and means for transmitting or receiving a first plurality of signals, to or from the first target area, via the first group of RIS's in accordance with the first configuration.

In an aspect, a non-transitory computer-readable medium stores computer-executable instructions that, when executed by a wireless node, cause the wireless node to: determine a sub-panel configuration associated with a reconfigurable intelligence surface (RIS) that includes a plurality of sub-panels; and transmit or receiving one or more signals via one or more sub-panels of the plurality of sub-panels in accordance with the sub-panel configuration.

In an aspect, a non-transitory computer-readable medium stores computer-executable instructions that, when executed by a wireless node, cause the wireless node to: determine a first configuration associated with a first group of reconfigurable intelligence surfaces (RIS's), each RIS of the first group of RIS's being configured based on the first configuration for enabling a respective signal path from the wireless node toward a first target area; and transmit or receive a first plurality of signals, to or from the first target area, via the first group of RIS's in accordance with the first configuration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 4A to 4C illustrate various types of radar.

FIG. 11 illustrates another example method of operating a wireless node, according to aspects of the disclosure.

DETAILED DESCRIPTION

Figure 1:
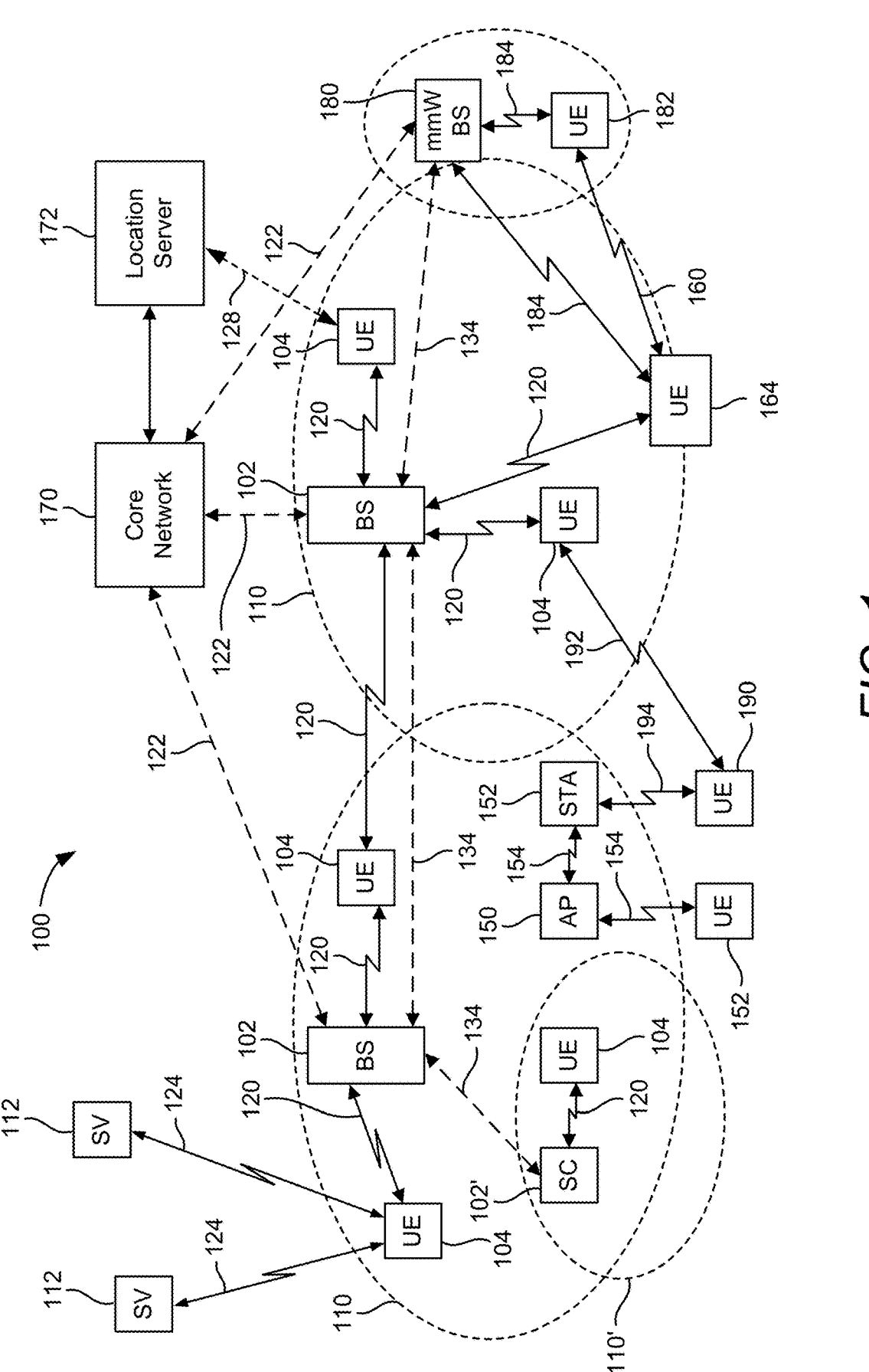
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation cNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHZ), FR4 (52.6 GHz-114.25 GHZ), and FR5 (114.25 GHz-300 GHZ). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (cV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
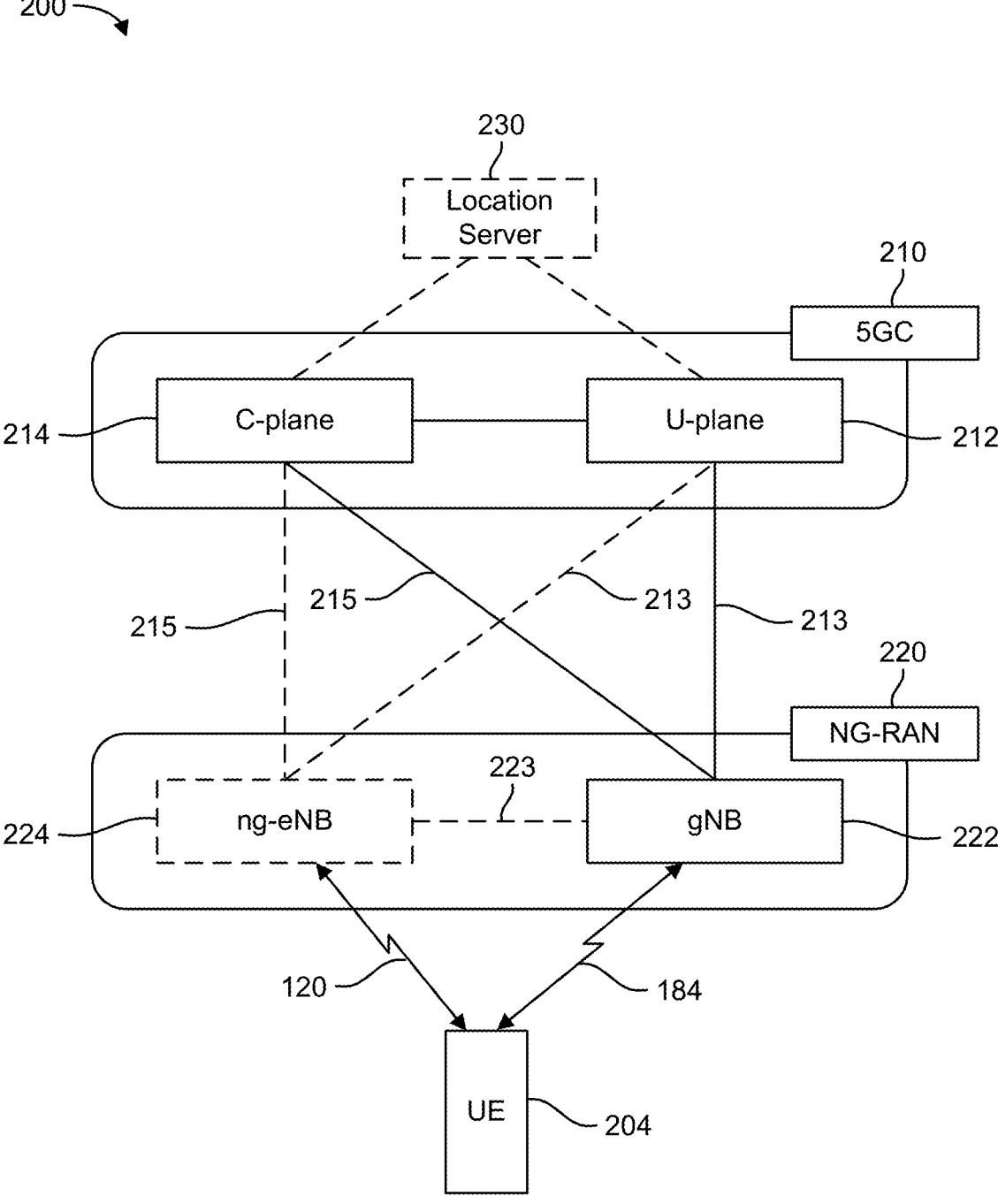
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
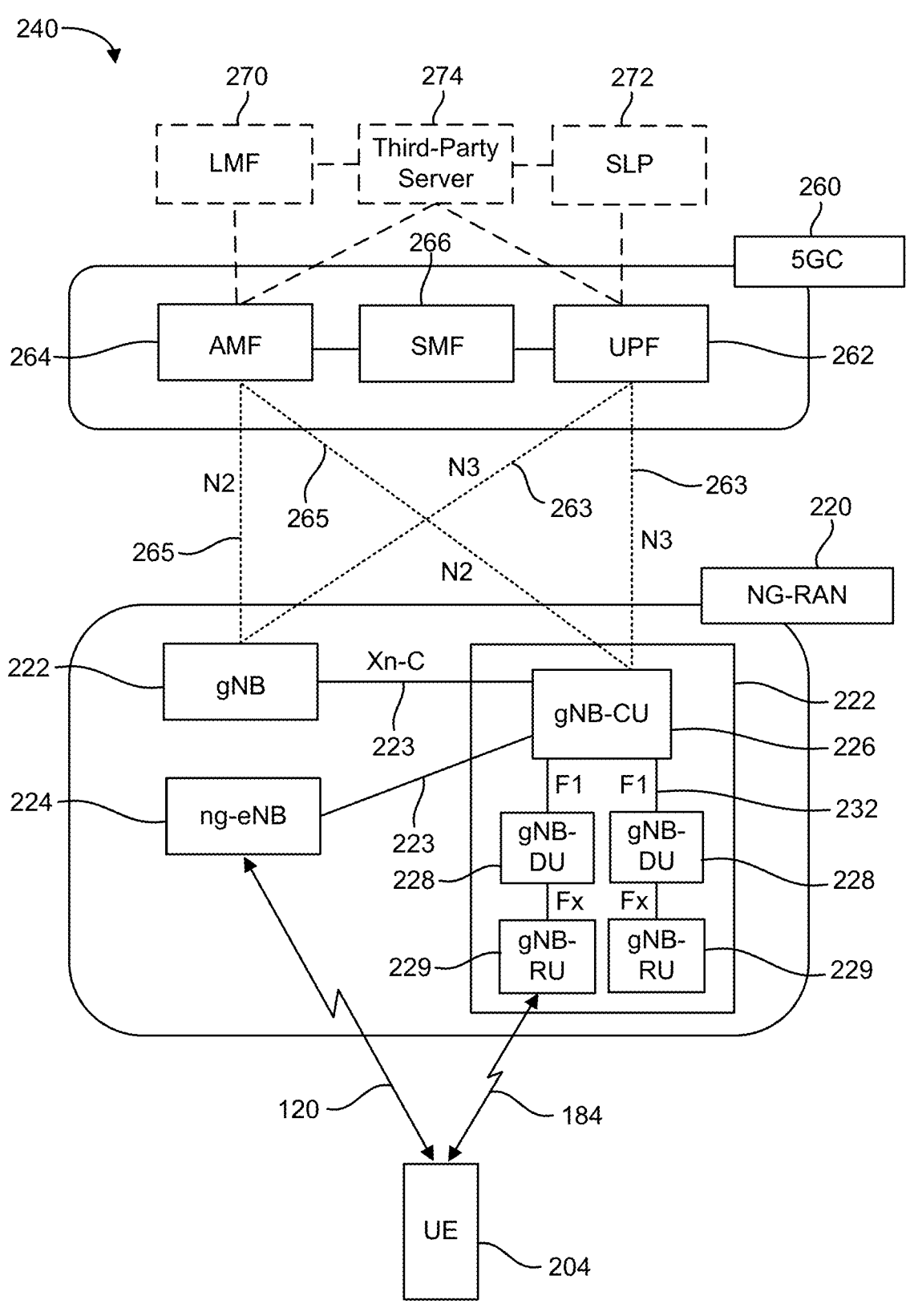

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-cNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-NB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (CNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
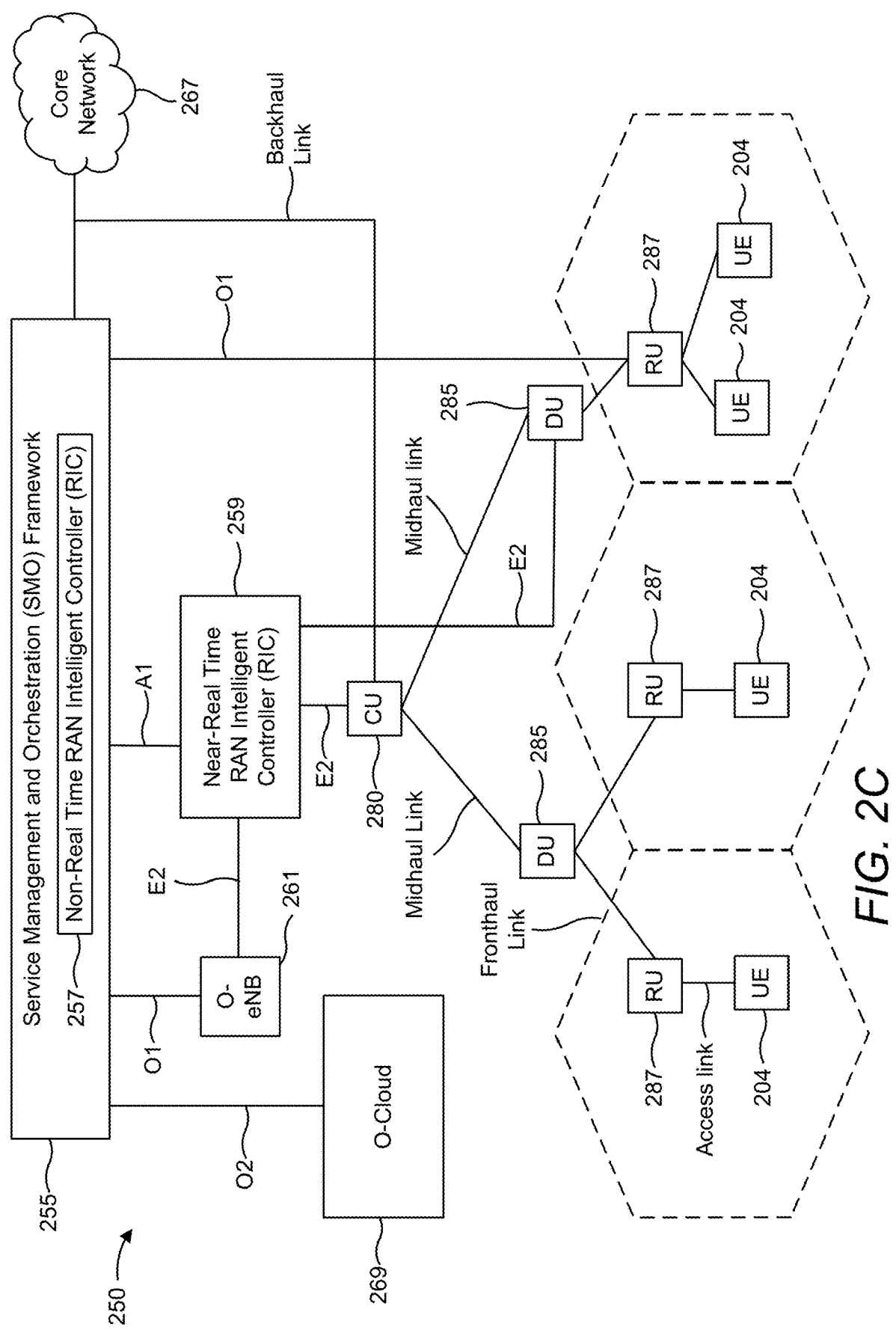

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 inter-face). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-cNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and opti-mization of RAN elements and resources, Artificial Intelli-gence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-CNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Frame-work 255 or the Non-RT RIC 257 from non-network data sources or from network functions. In some examples, the Non-RT RIC 257 or the Near-RT RIC 259 may be config-ured to tune RAN behavior or performance. For example, the Non-RT RIC 257 may monitor long-term trends and patterns for performance and employ AI/ML models to perform corrective actions through the SMO Framework 255 (such as reconfiguration via 01) or via creation of RAN management policies (such as A1 policies).

Figure 3A:
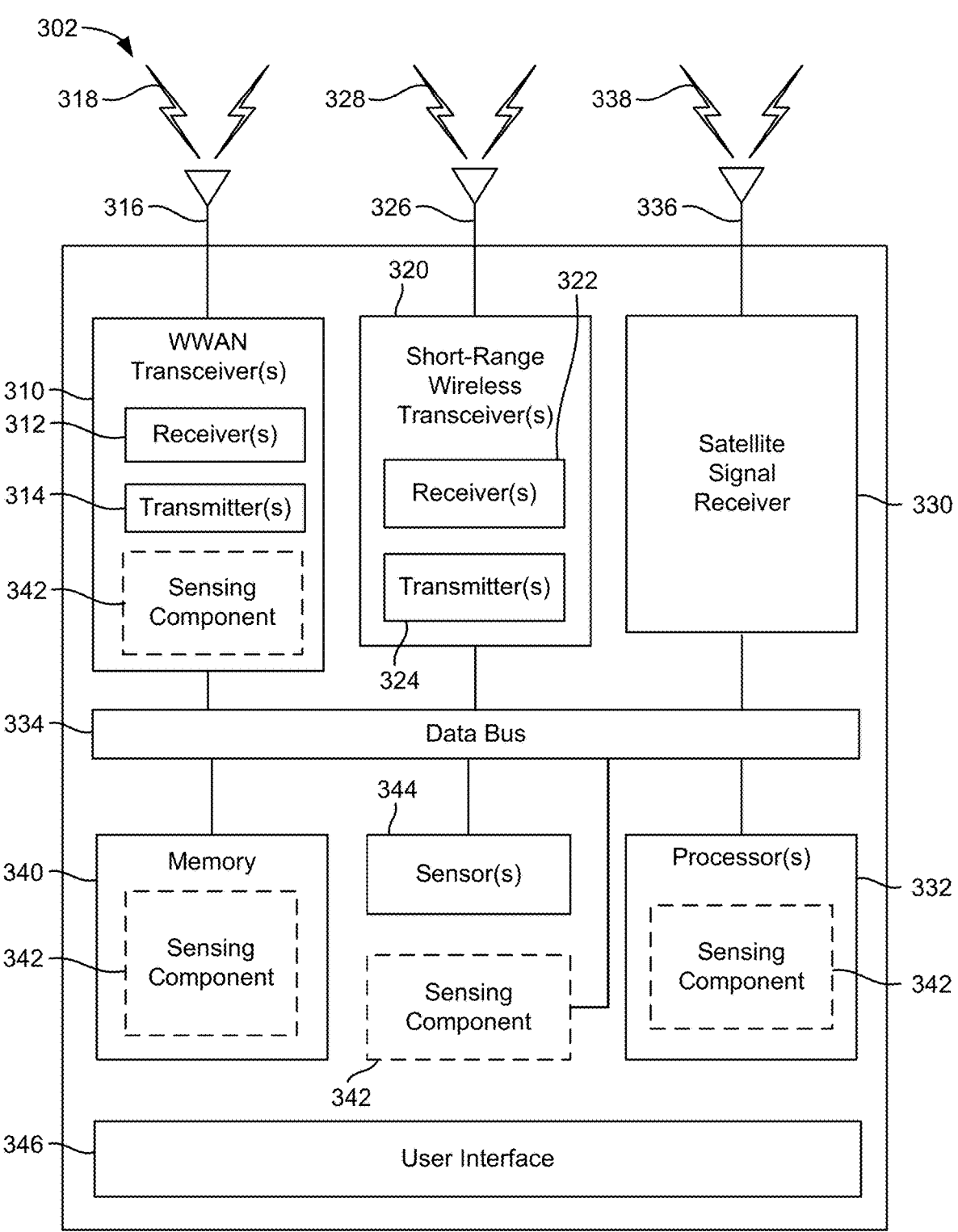
FIGS. 3A, 3B, and 3C are simplified block diagrams of several sample aspects of components that may be employed in a user equipment (UE), a base station, and a network entity, respectively, and configured to support communications as taught herein.
Figure 3B:
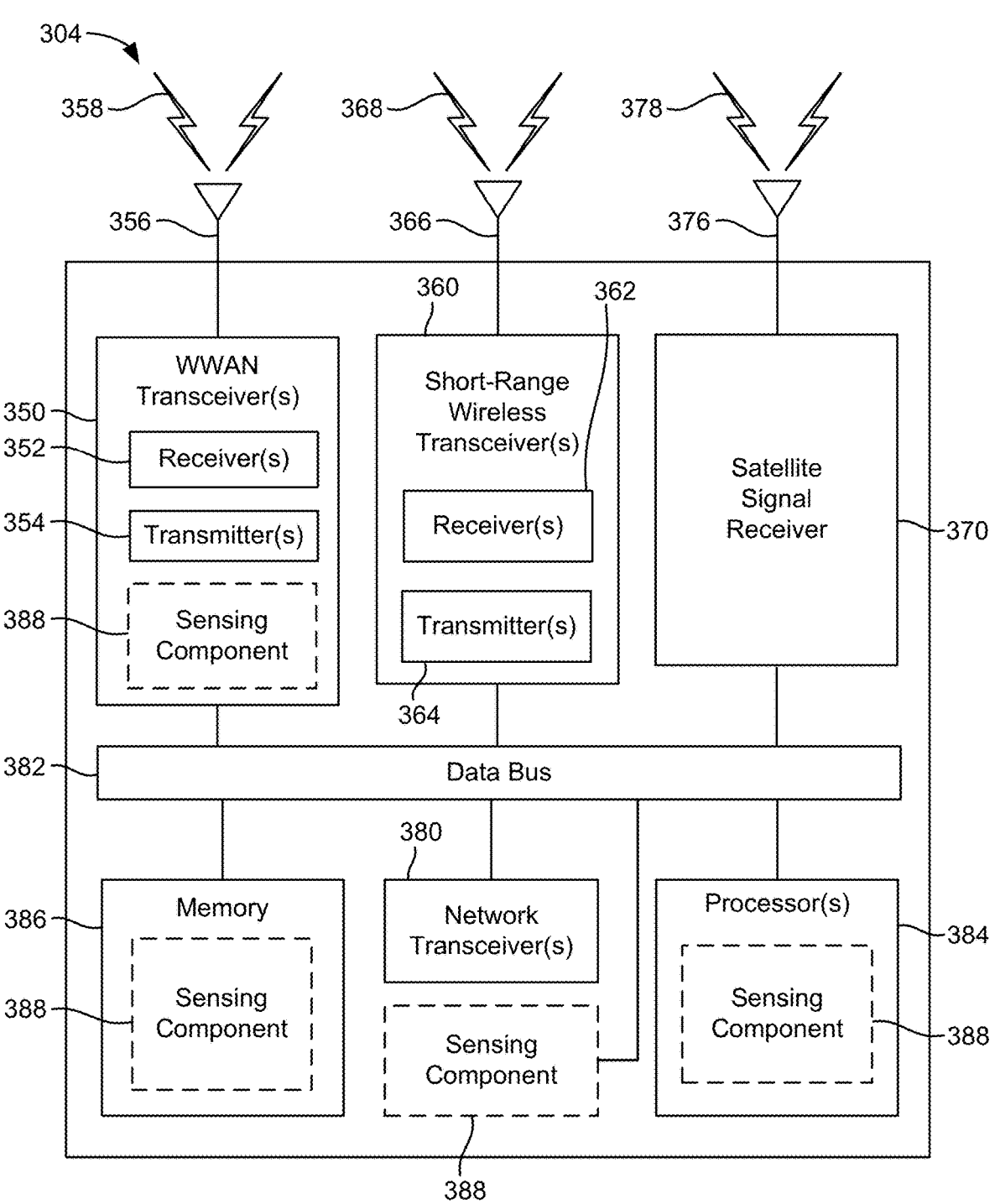
Figure 3C:
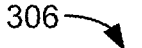

FIGS. 3A, 3B, and 3C illustrate several example compo-nents (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicat-ing with other network nodes, such as other UEs, access points, base stations (e.g., cNBs, gNBs), etc., via at least one designated RAT (e.g., NR, LTE, GSM, etc.) over a wireless communication medium of interest (e.g., some set of time/ frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, informa-tion, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include Sensing Component 342, 388, and 398, respectively. The Sensing Component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the Sensing Component 342, 388, and 398 may be external to the processors 332, 384, and 394 (e.g., part of a modem processing system, integrated with another processing system, etc.). Alternatively, the Sensing Component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the Sensing Component 342, which may be, for example, part of the one or more WWAN transceivers 310, the memory 340, the one or more processors 332, or any combination thereof, or may be a standalone component. FIG. 3B illustrates possible locations of the Sensing Component 388, which may be, for example, part of the one or more WWAN transceivers 350, the memory 386, the one or more processors 384, or any combination thereof, or may be a standalone component. FIG. 3C illustrates possible locations of the Sensing Component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the Sensing Component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4C:
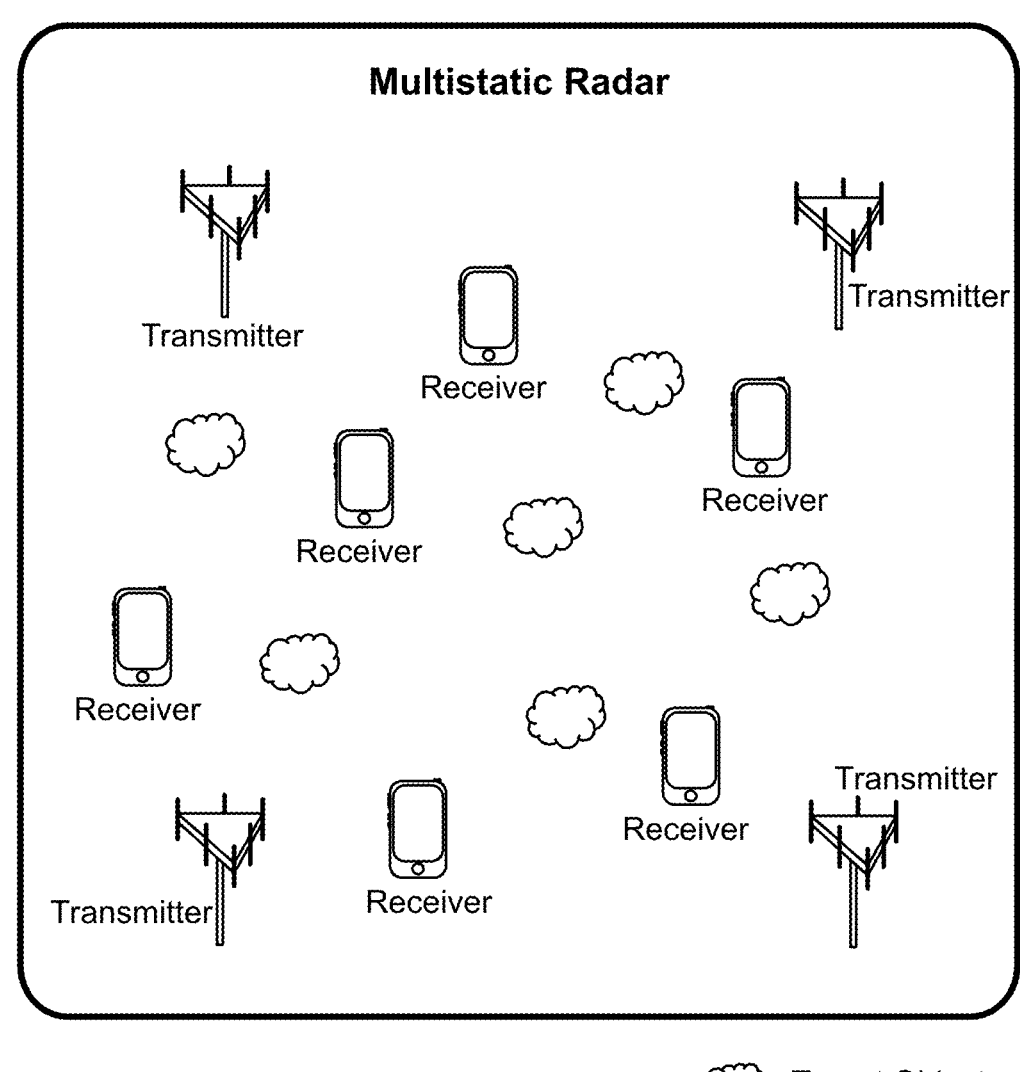

There are different types of radar, such as, for example, monostatic, bistatic, and multistatic radar (note that bistatic radar is a type of multistatic radar). FIGS. 4A to 4C illustrate examples of various types of radar. Specifically, FIG. 4A is a diagram 400 illustrating a monostatic radar scenario, FIG. 4B is a diagram 430 illustrating a bistatic radar scenario, and FIG. 4C is a diagram 450 illustrating a multistatic radar scenario.

In FIG. 4A, the transmitter and receiver are co-located. This is the typical use case for traditional, or conventional, radar. In an aspect, any wireless communication device (e.g., a UE or a base station) can be configured to perform RF sensing based on the monostatic radar scenario. The transmitter can transmit a sensing signal, and the co-located receiver can receive a returning signal that is a result of a target object interacting with (e.g., reflecting) the sensing signal. In FIG. 4A, the solid line represents the sensing signal from the transmitter, and the dashed line represents the returning signal from the target object. A radar station (not shown) that is coupled with the transmitter and the receiver can measure the time difference between transmission of the sensing signal and reception of the returning signal, and can determine a distance of the target object based on at least the measured time difference. In an aspect, the radar station can determine other characteristics of the target object, such as a direction, a moving direction, and a moving speed of the target object, based on the directivity of the sensing signal and/or the frequency and phase changes of the returning signal.

In FIG. 4B, the transmitter and receiver are not co-located, but rather, are separated. This is the typical use case for wireless communication-based (e.g., WiFi-based, LTE-based, NR-based) RF sensing. Note that while FIG. 4B illustrates using a downlink RF signal as the RF sensing signal, uplink RF signals can also be used as RF sensing signals. In a downlink scenario, as shown, the transmitter is a base station and the receiver is a UE, whereas in an uplink scenario, the transmitter is a UE and the receiver is a base station.

Referring to FIG. 4B in greater detail, the base station transmits RF sensing signals (e.g., PRS) to the UE, but some of the RF sensing signals reflect off a target object. In FIG. 4B, the solid line represents RF sensing signals that followed the direct (or line-of-sight (LOS)) path between the base station and the UE (labeled as "LOS Signal"), and the dashed lines represent the RF sensing signals that followed a reflected (or non-line-of-sight (NLOS)) path between base station and the UE due to reflecting off the target object (labeled as "NLOS Signal"). The base station may have transmitted multiple RF sensing signals in different directions, some of which followed the direct path and others of which followed the reflected path. Alternatively, the base station may have transmitted a single RF sensing signal in a broad enough beam that a portion of the RF sensing signal followed the direct path and a portion of the RF sensing signal followed the reflected path.

The UE can measure the time of arrival (ToAs) of the RF sensing signals (e.g., the LOS Signal) received directly from the base station and the ToAs of the RF sensing signals reflected from the target object (e.g., the NLOS Signal) to determine the distance, and possibly direction, to the target object. More specifically, based on the difference between the ToA of the direct path, the ToA of the reflected path, and the speed of light, the UE can determine the distance to the target object. In addition, if the UE is capable of receive beamforming, the UE may be able to determine the general direction to the target object as the direction of the receive beam on which the RF sensing signal following the reflected path was received. The UE may then optionally report this information to the transmitting base station, an application server associated with the core network, an external client, a third-party application, or some other entity. Alternatively, the UE may report the ToA measurements to the base station, or other entity, and the base station may determine the distance and, optionally, the direction to the target object.

Note that if the RF sensing signals are uplink RF signals transmitted by the UE to the base station, the base station would perform object detection based on the uplink RF signals just as the UE does based on the downlink RF signals.

Referring now to FIG. 4C, the transmitter and the corresponding receiver are again not co-located. In this multistatic radar scenario, however, there are multiple transmitters and multiple receivers. This is the typical use case for cellular communication-based (e.g., LTE-based, NR-based) RF sensing. Multistatic radar operates much like the operation of bistatic radar described above with reference to FIG. 4B, except that one transmitter may transmit RF sensing signals to multiple receivers and one receiver may receive RF sensing signals from multiple transmitters.

Possible use cases of multistatic cellular communication-based RF sensing include location detection of device-free objects (i.e., an object that does not itself transmit wireless signals or does not participate in being located). For example, multistatic cellular communication-based RF sensing can be used for environment scanning for self-organization networks (SONs). In FIG. 4C, while the base stations are labeled as transmitters and the UEs are labeled as receivers, any one of the base stations and the UEs can be configured as a transmitter of a receiver in a multistatic radar scenario.

MIMO radar is a type of radar that transmits mutually orthogonal signals from multiple transmit antennas, and extracts orthogonal waveforms from each of the receive antennas. For example, if a MIMO radar system has three transmit antennas and four receive antennas, 12 signals can be extracted from the receiver because of the orthogonality of the transmitted signals. In some examples, based on the configurations of the antennas, the MIMO radar system can be configured to exploit the spatial diversity gain of widely separated transmit antennas or receive antennas, or to exploit the increased radar aperture of co-located transmit antennas or receive antennas. In an aspect, whether two antennas (both for transmission or both for reception) are widely separated or co-located can be determined based on whether the separation thereof is sufficient to define two distinguishable observations of a target object with respect to the observation angle, the radar signature of the target object, or both.

Figure 5A:
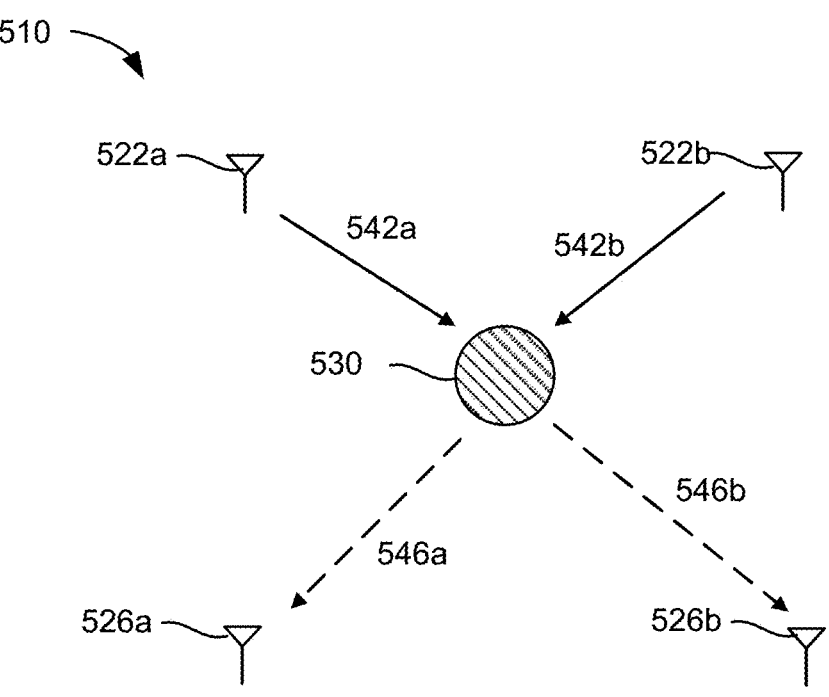
FIG. 5A illustrates a multiple-input multiple-output (MIMO) radar system having widely separated transmit antennas and widely separated receive antennas.

FIG. 5A illustrates a MIMO radar system 510 having widely separated transmit antennas 522a and 522b and widely separated receive antennas 526a and 526b. MIMO radar system 510 can be configured to operate as a non-coherent MIMO radar system. Transmit antennas 522a and 522b can transmit sensing signals 542a and 542b toward a target object 530. Sensing signals 542a and 542b may interact with target object 530, and the reflect signals may radiate from target object 530 because of the interaction between sensing signals 542a and 542b and target object 530. A portion of the reflect signals becomes a returning signal 546a received by receive antenna 526a, and another portion of the reflect signals becomes a returning signal 546b received by receive antenna 526b. A radar processor (not shown) of MIMO radar system 510 can process the received returning signals 546a and 546b to determine, for example, a location of target object 530.

Figure 5B:
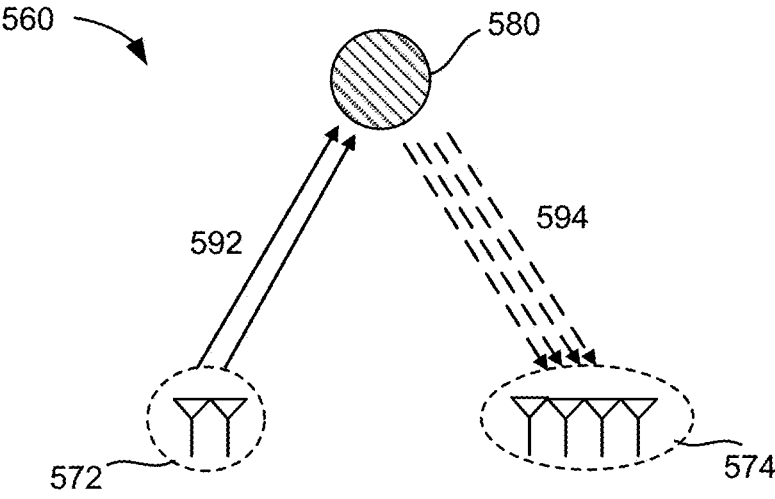
FIG. 5B illustrates a MIMO radar system having co-located transmit antennas and co-located receive antennas.

FIG. 5B illustrates a MIMO radar system 560 having co-located transmit antennas 572 and co-located receive antennas 574. In some implementations, transmit antennas 572 and receive antennas 574 can be co-located for sensing based on a monostatic radar scenario. MIMO radar system 560 can be configured to operate as a coherent MIMO radar system. Transmit antennas 572 can transmit sensing signals 592 toward a target object 580. Sensing signals 592 may interact with target object 580, and the reflect signals may radiate from target object 580 because of the interaction between sensing signals 592 and target object 580. A portion of the reflect signals becomes returning signals 594 received by receive antennas 574. Sensing signals 592 include waveforms that are orthogonal from one another. A radar processor (not shown) of MIMO radar system 560 can process the received returning signals 574 to extract the contribution of each transmit antenna by exploiting the orthogonality of sensing signals 592 and determine, for example, a location of target object 580 accordingly.

According to some aspects, the antenna arrangement for MIMO radar system 510 better resembles MIMO communications than the antenna arrangement for MIMO radar system 560. Both MIMO radar system 510 and MIMO radar system 560 may harvest the spatial gain of the antennas. Also, MIMO radar system 560 may increase the effective radar aperture at the cost of signal-to-noise ratio (SNR).

In one aspect, MIMO radar system 510 can be configured for multistatic radar sensing. In one aspect, MIMO radar system 510 can be configured to have paired transmit antenna and receive antenna for bistatic radar sensing. Moreover, in one aspect, MIMO radar system 560 can be configured for bistatic radar sensing or monostatic radar sensing.

Figure 6:
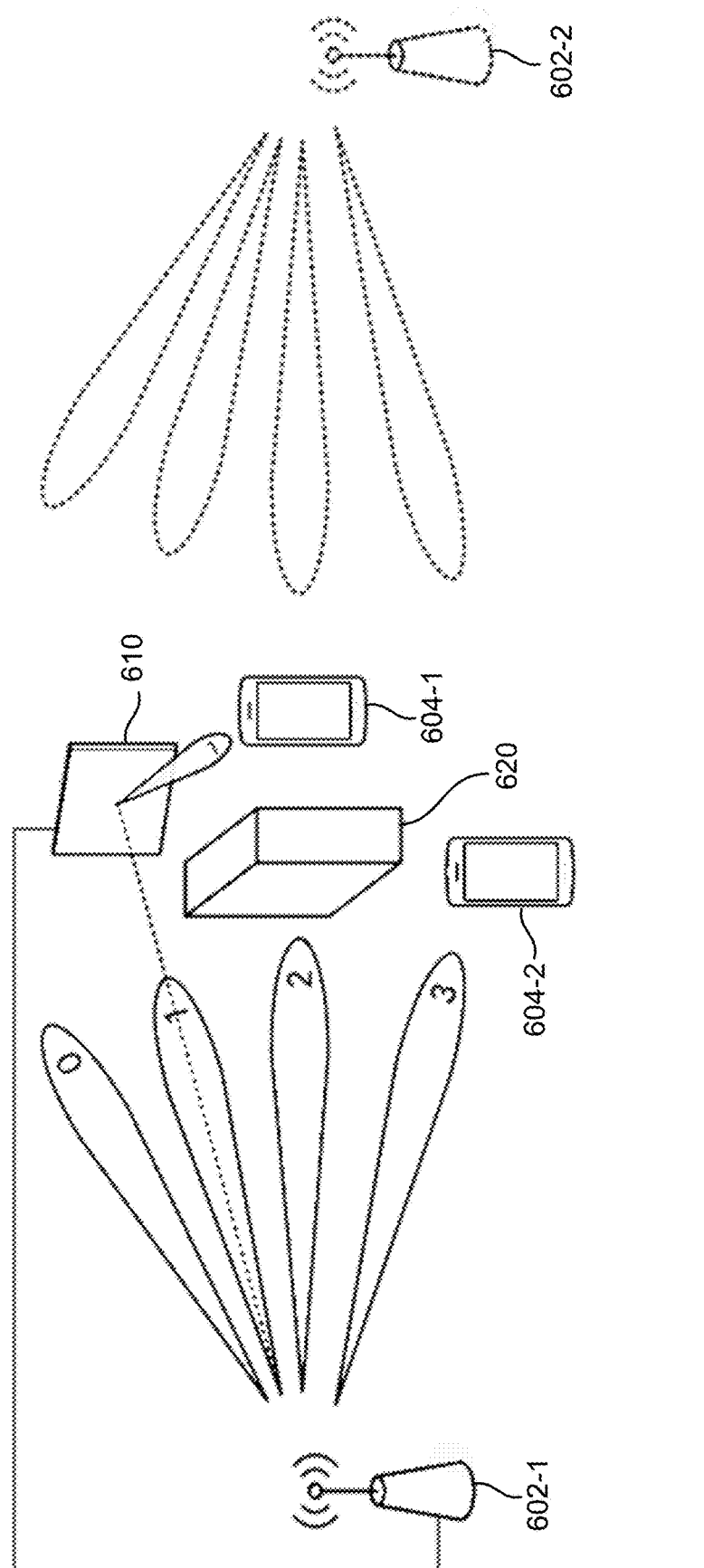
FIG. 6 illustrates an example system for wireless communication using a reconfigurable intelligent surface (RIS), according to aspects of the disclosure.

FIG. 6 illustrates an example system 600 for wireless communication using a reconfigurable intelligent surface (RIS) 610, according to aspects of the disclosure. An RIS (e.g., RIS 610) is a two-dimensional surface comprising a large number of low-cost, low-power near-passive reflecting elements whose properties are reconfigurable (e.g., by software or control signals) rather than static. For example, by carefully tuning the phase shifts of the reflecting elements (e.g., using software or control signals), the scattering, absorption, reflection, and diffraction properties of an RIS can be changed over time. In that way, the electromagnetic (EM) properties of an RIS can be engineered to collect wireless signals from a transmitter (e.g., a base station, a UE, etc.) and passively beamform them towards a target receiver (e.g., another base station, another UE, etc.). In the example of FIG. 6, a first base station 602-1 controls the reflective properties of an RIS 610 in order to communicate with a first UE 604-1.

The goal of RIS technology is to create smart radio environments, where the wireless propagation conditions are co-engineered with the physical layer signaling. This enhanced functionality of the system 600 can provide technical benefits in a number of scenarios.

As a first example scenario, as shown in FIG. 6, the first base station 602-1 (e.g., any of the base station described herein) is attempting to transmit downlink wireless signals to the first UE 604-1 and a second UE 604-2 (e.g., any two of the UEs described herein, collectively, UEs 604) on a plurality of downlink transmit beams, labeled "0," "1," "2," and "3." However, unlike the second UE 604-2, because the first UE 604-1 is behind an obstacle 620 (e.g., a building, a hill, or another type of obstacle), it cannot receive the wireless signal on what would otherwise be the line-of-sight (LOS) beam from the first base station 602-1, that is, the downlink transmit beam labeled "2." In this scenario, the first base station 602-1 may instead use the downlink transmit beam labeled "1" to transmit the wireless signal to the RIS 610, and configure the RIS 610 to reflect/beamform the incoming wireless signal towards the first UE 604-1. The first base station 602-1 can thereby transmit the wireless signal around the obstacle 620.

Note that the first base station 602-1 may also configure the RIS 610 for the first UE's 604-1 use in the uplink. In that case, the first base station 602-1 may configure the RIS 610 to reflect an uplink signal from the first UE 604-1 to the first base station 602-1, thereby enabling the first UE 604-1 to transmit the uplink signal around the obstacle 620.

As another example scenario in which system 600 can provide a technical advantage, the first base station 602-1 may be aware that the obstacle 620 may create a "dead zone," that is, a geographic area in which the downlink wireless signals from the first base station 602-1 are too attenuated to be reliably detected by a UE within that area (e.g., the first UE 604-1). In this scenario, the first base station 602-1 may configure the RIS 610 to reflect downlink wireless signals into the dead zone in order to provide coverage to UEs that may be located there, including UEs about which the first base station 602-1 is not aware.

An RIS (e.g., RIS 610) may be designed to operate in either a first mode (referred to as "Mode 1"), in which the RIS operates as a reconfigurable mirror, or a second mode (referred to as "Mode 2"), in which the RIS operates as a receiver and transmitter (similar to the amplify and forward functionality of a relay node). Some RIS may be designed to be able to operate in either Mode 1 or Mode 2, while other RIS may be designed to operate only in either Mode 1 or Mode 2. Mode 1 RIS are assumed to have a negligible hardware group delay, whereas Mode 2 RIS have a non-negligible hardware group delay due to being equipped with limited baseband processing capability. Because of their greater processing capability compared to Mode 1 RIS, Mode 2 RIS may, in some cases, be able to compute and report their transmission-to-reception (Tx-Rx) time difference measurements (i.e., the difference between the time a signal is reflected towards a UE and the time the signal is received back from the UE). In the example of FIG. 6, the RIS 610 may be either a Mode 1 or Mode 2 RIS.

FIG. 6 also illustrates a second base station 602-2 that may transmit downlink wireless signals to one or both of the UEs 604. As an example, the first base station 602-1 may be a serving base station for the UEs 604 and the second base station 602-2 may be a neighboring base station. The second base station 602-2 may transmit downlink positioning reference signals to one or both of the UEs 604 as part of a positioning procedure involving the UE(s) 604. Alternatively or additionally, the second base station 602-2 may be a secondary cell for one or both of the UEs 604. In some cases, the second base station 602-2 may also be able to reconfigure the RIS 610, provided it is not being controlled by the first base station 602-1 at the time.

Note that while FIG. 6 illustrates one RIS 610 and one base station controlling the RIS 610 (i.e., the first base station 602-1), the first base station 602-1 may control multiple RIS 610. In addition, the RIS 610 may be controlled by multiple base stations 602 (e.g., both the first and second base stations 602-1 and 602-2, and possibly more).

Figure 7:
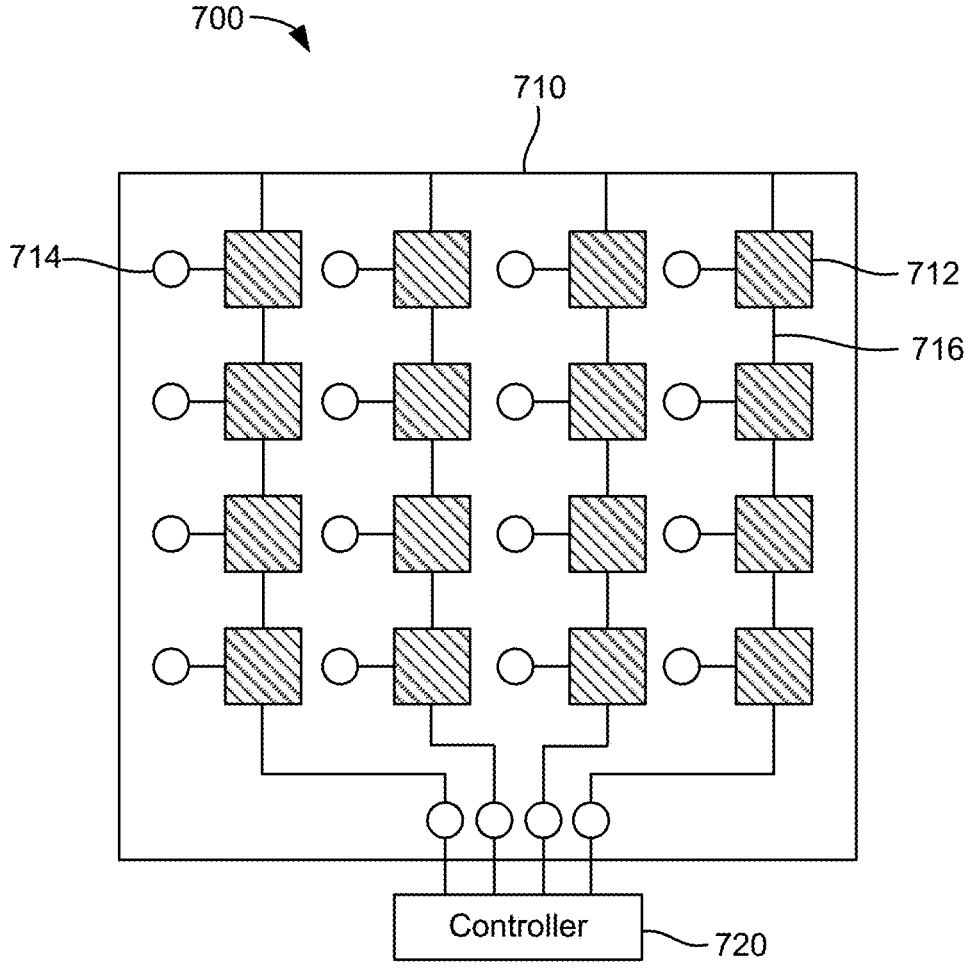
FIG. 7 is a diagram of an example architecture of a RIS, according to aspects of the disclosure.

FIG. 7 is a diagram of an example architecture of a RIS 700, according to aspects of the disclosure. The RIS 700, which may correspond to RIS 610 in FIG. 6, may be a Mode 1 RIS. As shown in FIG. 7, the RIS 700 primarily consists of a planar surface 710 and a controller 720. The planar surface 710 may be constructed of one or more layers of material. In the example of FIG. 7, the planar surface 710 may consist of three layers. In this case, the outer layer has a large number of reflecting elements 712 printed on a dielectric substrate to directly act on the incident signals. The middle layer is a copper panel to avoid signal/energy leakage. The last layer is a circuit board that is used for tuning the reflection coefficients of the reflecting elements 712 and is operated by the controller 720. The controller 720 may be a low-power processor, such as a field-programmable gate array (FPGA).

In a typical operating scenario, the optimal reflection coefficients of the RIS 700 is calculated at the base station (e.g., the first base station 602-1 in FIG. 6), and then sent to the controller 720 through a dedicated feedback link. The design of the reflection coefficients depends on the channel state information (CSI), which is only updated when the CSI changes, which is on a much longer time scale than the data symbol duration. As such, low-rate information exchange is sufficient for the dedicated control link, which can be implemented using low-cost copper lines or simple cost-efficient wireless transceivers.

Each reflecting element 712 is coupled to a positive-intrinsic negative (PIN) diode 714. In addition, a biasing line 716 connects each reflecting element 712 in a column to the controller 720. By controlling the voltage through the biasing line 716, the PIN diodes 714 can switch between 'on' and 'off' modes. This can realize a phase shift difference of $\pi$ (pi) in radians. To increase the number of phase shift levels, more PIN diodes 714 can be coupled to each reflecting element 712. In one aspect, the reflecting elements 712 can be grouped into subsets of reflecting elements that are also referred to as sub-panels. The reflective characteristics of the RIS 700 can be controlled on a sub-panel basis, where each sub-panel can be treated as a mini RIS co-located with other sub-panels.

An RIS, such as RIS 700, has important advantages for practical implementations. For example, the reflecting elements 712 only passively reflect the incoming signals without any sophisticated signal processing operations that would require RF transceiver hardware. As such, compared to conventional active transmitters, the RIS 700 can operate with several orders of magnitude lower cost in terms of hardware and power consumption. Additionally, due to the passive nature of the reflecting elements 712, an RIS 700 can be fabricated with light weight and limited layer thickness, and as such, can be readily installed on a wall, a ceiling, signage, a street lamp, etc. Further, the RIS 700 can operate in full-duplex (FD) mode without self-interference or introducing thermal noise. Therefore, it can achieve higher spectral efficiency than active half-duplex (HD) relays, despite their lower signal processing complexity than that of active FD relays requiring sophisticated self-interference cancelation.

Figure 8:
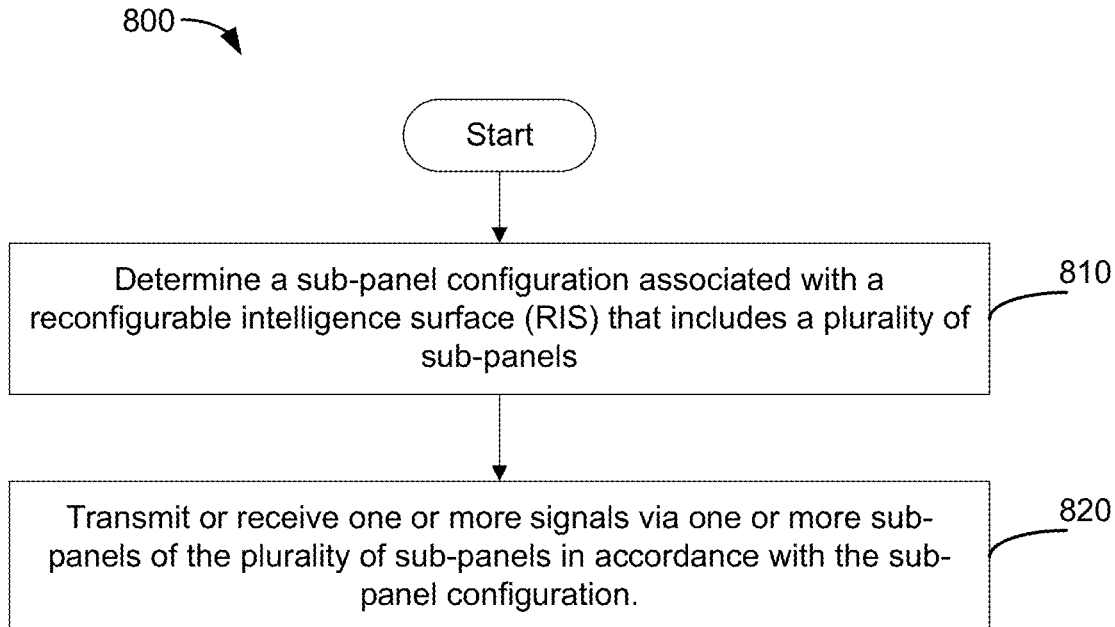
FIG. 8 illustrates an example method of operating a wireless node, according to aspects of the disclosure.

FIG. 8 illustrates an example method 800 of operating a wireless node, according to aspects of the disclosure. In an aspect, method 800 may be performed by a wireless node performing a MIMO radar sensing operation (e.g., any of the UEs, base stations, or O-RAN components described herein). In one aspect, the wireless node may correspond to a UE, such as V-UEs 106 in FIG. 1, UE 204 in FIGS. 2A and 2B, and UE 302 in FIG. 3A. In one aspect, the wireless node may correspond to a base station, such as BS's 102 in FIG. 1, NG-RAN 220 in FIGS. 2A and 2B, and base station 304 in FIG. 3B.

At 810, the wireless node can determine a sub-panel configuration associated with a reconfigurable intelligence surface (RIS) that includes a plurality of sub-panels. In an aspect, operation 810 may be performed by the one or more WWAN transceivers 310, the one or more short-range wireless transceivers 320, the one or more processors 332, memory 340, and/or sending component 342 in UE 302, or the one or more WWAN transceivers 350, the one or more short-range wireless transceivers 360, the one or more processors 384, memory 386, and/or sensing component 388 in base station 304, and any or all of which may be considered means for performing this operation. In one aspect, the RIS may correspond to RIS 700 in FIG. 7.

At 820, the wireless node can transmit or receive one or more signals via one or more sub-panels of the plurality of sub-panels in accordance with the sub-panel configuration. In an aspect, operation 820 may be performed by the one or more WWAN transceivers 310, the one or more short-range wireless transceivers 320, the one or more processors 332, memory 340, and/or sending component 342 in UE 302, or the one or more WWAN transceivers 350, the one or more short-range wireless transceivers 360, the one or more processors 384, memory 386, and/or sensing component 388 in base station 304, and any or all of which may be considered means for performing this operation.

As will be appreciated, a technical advantage of the method 800 is configurations for creating orthogonal signals for a MIMO radar sensing operation using sub-panels of a RIS, such that the MIMO sensing can be enabled or improved without sacrificing the beam forming gain at the wireless node (e.g., a base station or a UE). Also, the sensing signal-to-interference-plus-noise ratio (SINR) can be improved by positioning the RIS closer to the target area.

Figure 9:
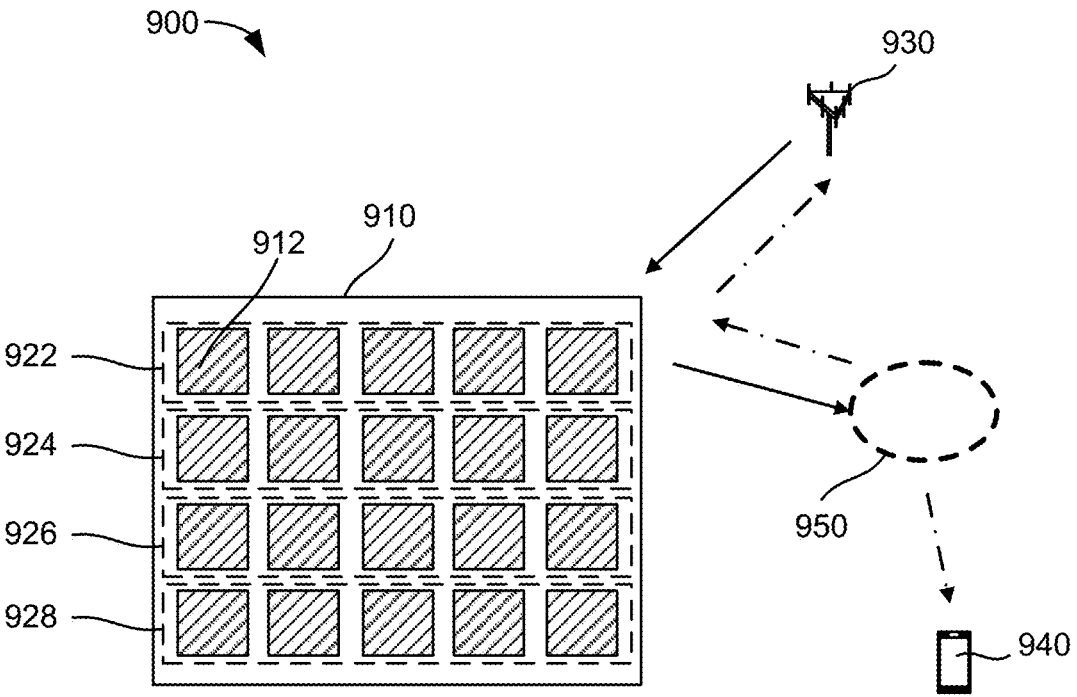
FIG. 9 illustrates a MIMO radar system with RIS sub-panels-based MIMO radar sensing, according to aspects of the disclosure.
Figure 10:
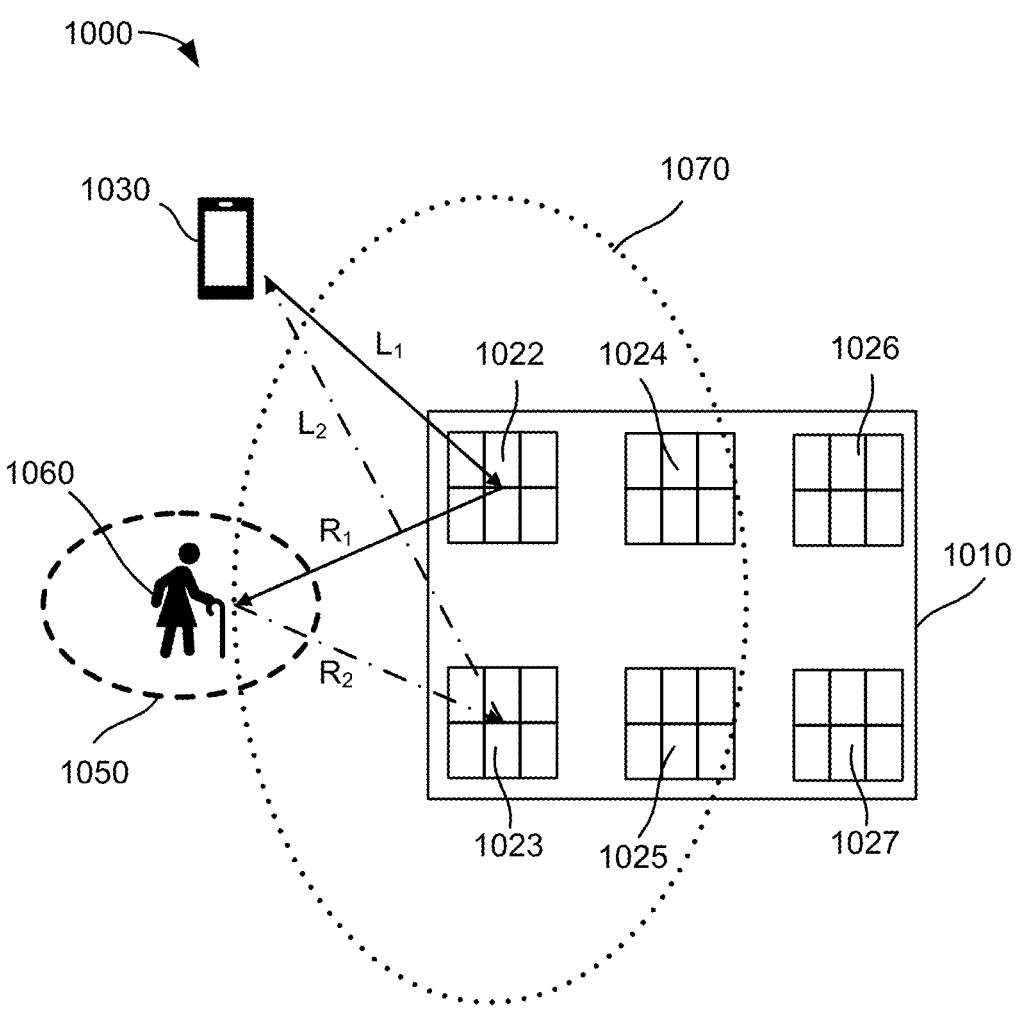
FIG. 10 illustrates a MIMO radar system based on at least one transmission-specific sub-panel and at least one reception-specific sub-panel, according to aspects of the disclosure.

FIGS. 9 and 10 depict non-limiting examples of implementations based on method 800.

FIG. 9 illustrates a MIMO radar system 900 with RIS sub-panels-based MIMO radar sensing, according to aspects of the disclosure. MIMO radar system 900 includes a RIS 910, which may correspond to RIS 700 in FIG. 7 and includes a controller (not shown), a plurality of reflecting elements (912, which may correspond to reflecting elements 712 in FIG. 7), and corresponding biasing lines (not shown) and PIN diodes (not shown). Reflecting elements 912 can be grouped into sub-panels 922, 924, 926, and 928. Each sub-panel may include one or more reflecting elements, and can be controlled to function as a mini RIS and assigned its own RIS ID or watermark. In other words, RIS 910 can be divided into multiple sub-panels, which can be considered as multiple co-located mini RIS's. In an aspect, any two of the sub-panels can be non-overlapping or partially overlapping.

MIMO radar system 900 may include a wireless node 930 and a wireless node 940. In an aspect, when MIMO radar system 900 is configured to perform the MIMO radar sensing operation according to a monostatic radar scenario, wireless node 930 can transmit a sensing signals and wireless node 930 can receive a returning signal that corresponds to an echo resulting from an interaction between the sensing signal and a target object in a target area 950 via RIS 910. In such scenario, wireless node 940 can be omitted. In an aspect, when MIMO radar system 900 is configured to perform the MIMO radar sensing operation according to a multistatic radar scenario or a bistatic radar scenario, wireless node 930 can transmit a sensing signals and wireless node 940 can receive a returning signal that corresponds to an echo resulting from an interaction between the sensing signal and a target object in target area 950. In some implementations, wireless node 930 and wireless node 940 can be one UE and one network component, two UEs, or two network components, where a network component may be a base station, an O-RAN component such as RU, DU or CU, etc.

In operation, wireless node 930 can determine a sub-panel configuration associated with RIS 910 that includes a plurality of sub-panels (e.g., sub-panels 922, 924, 926, and 928). Wireless node 930 can transmit or receive one or more signals via one or more sub-panels of the plurality of sub-panels in accordance with the sub-panel configuration. In one aspect, wireless node 930 can transmit, via a first sub-panel (e.g., sub-panel 922) of the plurality of sub-panels, a first sensing signal for performing a MIMO radar sensing operation to target area 950 based on the sub-panel configuration. In one aspect, wireless node 930 can further transmit, via a second sub-panel (e.g., sub-panel 924) of the plurality of sub-panels, a second sensing signal for performing the MIMO radar sensing operation to target area based 950 on the sub-panel configuration. In one aspect, the first sensing signal and the second sensing signal can be obtained by the sub-panels from a same source sensing signal transmitted by wireless node 930. Therefore, by dividing RIS 910 into sub-panels, each sub-panel can define a sensing signal orthogonal to those defined by other sub-panels. Hence, the sub-panels can be treated as different transmit antennas for a MIMO radar sensing operation. In some implementations, the first sensing signal can be distinguishable from the second sensing signal by orthogonality thereof based on one or more of TDM, FDM, or CDM in accordance with the sub-panel configuration.

In an aspect, the CDM corresponds to individual sub-panels of RIS 910 being configured to incorporate different watermarks or orthogonal complementary codes embedded in corresponding sensing signals, respectively. In an aspect, the TDM corresponds to wireless node 930 transmitting signals toward the individual sub-panels at different time durations. In another aspect, the TDM corresponds to the sub-panels of RIS 910 are set to form suitable signal paths between wireless node 930 and target area 950 at different time durations. In one implementation, the sub-panels of RIS 910 can be scheduled to be used for the MIMO radar sensing operation closely in time (e.g., back-to-back configuration). In an aspect, the FDM corresponds to the wireless node transmitting signals toward the sub-panels of RIS 910 at different frequencies. In some implementations, orthogonality of the sensing signals can be achieved by adopting individual or any combination of CDM, TDM, and FDM. For example, even when TDM or FDM is used to distinguish different sensing signals, CDM can still be used to differentiate the reflection from the RIS sub-panels and the reflection from the environment.

In some aspects, wireless node 930 or wireless node 940 that receives a returning signal can identify the received returning signal from a specific reception signal path based on a watermark or an orthogonal complementary code associated with a corresponding sub-panel (e.g., the third sub-panel) embedded in the returning signal. In an aspect, wireless node 930 or wireless node 940 can identify the received returning signal as corresponding to a sensing signal from a specific transmission signal path based on another watermark or another orthogonal complementary code associated with the corresponding sub-panel (e.g., the first sub-panel) embedded in the returning signal. In some implementations, the watermark or the orthogonal complementary code associated with the sub-panel on the reception path (e.g., the third sub-panel) includes an indicator indicating that such sub-panel is configured to enable a signal path for reception performed by a receiving wireless node; and the other watermark or the other orthogonal complementary code associated with the sub-panel on the transmission path (e.g., the first sub-panel) includes another indicator indicating that such sub-panel is configured to enable a signal path for transmission performed by a transmitting wireless node.

In some aspects, the RIS sub-panels-based MIMO radar sensing operation performed based on the sub-panels of RIS

910 can be a coherent MIMO radar sensing operation. In some aspects, a wireless node (i.e., wireless node 930) for performing the RIS sub-panels-based MIMO radar sensing operation in conjunction with RIS 910 can be a UE or a base station. In some implementations, the wireless node can be a base station that controls RIS 910. In some other implementations, the wireless node can be a base station or a UE that receives the sub-panel configuration from another base station or a server device that controls RIS 910. In an aspect, the sub-panel configuration may include RIS IDs, timing, resource, beam coordination, RIS watermark information of the sub-panels of a RIS.

In one aspect, the resulting MIMO radar system can be configured to perform the MIMO radar sensing operation according to a monostatic radar scenario. Wireless node 930 can receive, via one or more sub-panels of RIS 910, respective returning signals in response to the corresponding sensing signals for performing the MIMO radar sensing operation from target area 950 based on the sub-panel configuration associated with RIS 910.

In one aspect, the reflective elements of RIS 910 can be full-duplex, and wireless node 930 can receive, via the first sub-panel, a returning signal in response to the first sensing signal for performing the MIMO radar sensing operation from target area 950 based on the sub-panel configuration.

In one aspect, the reflective elements of RIS 910 can be half-duplex, and wireless node 930 can receive, via a third sub-panel, a returning signal in response to the first sensing signal for performing the MIMO radar sensing operation from target area 950 based on the sub-panel configuration. In some implementations, the first sub-panel and the third sub-panel can be paired based on the sub-panel configuration, where the first sub-panel can be configured based on the sub-panel configuration to enable a signal path for transmission performed by wireless node 930 (e.g., configured as a transmission-specific sub-panel), and the third sub-panel can be configured based on the sub-panel configuration to enable a signal path for reception performed by wireless node 930 (e.g., configured as a reception-specific sub-panel). In some implementations, wireless node 930 may obtain the watermark of a transmission-specific sub-panel and the watermark of a reception-specific sub-panel that is paired with the transmission-specific sub-panel. As such, wireless node 930 may apply different combinations of watermarks to extract orthogonal signals for performing a MIMO radar sensing operation.

FIG. 10 illustrates a MIMO radar system 100 based on at least one transmission-specific sub-panel and at least one reception-specific sub-panel, according to aspects of the disclosure. In FIG. 10, MIMO radar system 100 is configured based on a monostatic radar scenario and includes a RIS 1010 (which may correspond to any of the RIS's described herein) and a wireless node 1030 (which may correspond to any of the UEs or the base stations described herein). RIS 1010 can be divided into multiple sub-panels 1022, 1023, 1024, 1025, 1026, and 1027. In some implementations, sub-panels 1022, 1024, and 1026 can be configured as transmission-specific sub-panels that enable respective signal paths for transmission performed by wireless node 1030 for transmitting sensing signals to a target area 1050. In some implementations, sub-panels 1023, 1025, and 1027 can be configured as reception-specific sub-panels that enable respective signal paths for reception performed by wireless node 1030 for receiving returning signals from target area 1050.

In some aspect, any one of transmission-specific sub-panels 1022, 1024, and 1026 may be paired with any one of reception-specific sub-panels 1023, 1025, and 1027 to form a respective signal path from wireless node 1030 to target area 1050 via the corresponding transmission-specific sub-panel, and then from target area 1050 to wireless node 1030 via the corresponding reception-specific sub-panel.

The number of sub-panels and the relative positions of the sub-panels in RIS 1010 are depicted in FIG. 10 as a non-limiting example. In some implementations, the RIS 1010 can have any number transmission-specific sub-panels and reception-specific sub-panels arranged at positions different from those depicted in FIG. 10.

In one aspect, MIMO radar system 1000 can detect a target object 1060 based on the sensing signal (depicted as solid-line arrows) via sub-panel 1022 and returning signal (depicted as dashed-line arrows) via sub-panel 1023. The location of the target object 1060 can be estimated based on the pair of sub-panels 1022 and 1023 by triangulation or by ellipsoid-based target location using sub-panels 1022 and 1023 as anchors.

For example, the position of target object 1060 can be determined according to a summation $R_{sum}$ of a first distance $R_1$ and a second distance $R_2$, $R_1$ representing a distance between target object 1060 and sub-panel 1022, and $R_2$ representing a distance between the target object 1060 and sub-panel 1023. In one aspect, a reference ellipsoid 1070 can be defined by using positions of the sub-panel 1022 and third sub-panel 1023 as anchors of the reference ellipsoid 1070. The summation $R_{sum}$ of the first distance $R_1$ and the second distance $R_2$ can be determined according to an equation of $$R_{sum}=R_1+R_2=(T_{Rx}-T_{TxLOS})^*c-(L_1-L_2),$$

where $L_1$ represents a third distance between wireless node 1030 and sub-panel 1022, $L_2$ represents a fourth distance between wireless node 1030 and sub-panel 1023, c represents a propagation speed of electromagnetic waves, $T_{TxLos}$ represents a first time that wireless node 1030 transmits a sensing signal, $T_{Rx}$ represents a second time that wireless node 1030 receives a returning signal via sub-panel 1023, and the returning signal is an echo resulting from an interaction between the sensing signal via sub-panel 1022 and the target object 1060. In an aspect, wireless node 1030 may have the information regarding the position of RIS 1010 and the positions of sub-panels 1022 and 1023. Accordingly, the distance $L_1$ and the distance $L_2$ can be assumed as known to wireless node 1030. In some implementations, multiple range summations (e.g., $R_{sum}$) measured through multiple pairs of transmission-specific sub-panel and reception-specific sub-panel can be used to determine the location of target object 1060.

FIG. 11 illustrates another example method 1100 of operating a wireless node, according to aspects of the disclosure. In an aspect, method 1100 may be performed by a wireless node performing a MIMO radar sensing operation (e.g., any of the UEs or base stations described herein). In one aspect, the wireless node may correspond to a UE, such as V-UEs 106 in FIG. 1, UE 204 in FIGS. 2A and 2B, and UE 302 in FIG. 3A. In one aspect, the wireless node may correspond to a network component (e.g., base station, O-RAN component such as RU, DU or CU, etc.), such as BS's 102 in FIG. 1, NG-RAN 220 in FIGS. 2A and 2B, and base station 304 in FIG. 3B.

At 1110, the wireless node can determine a first configuration associated with a first group of reconfigurable intelligence surfaces (RIS's), each RIS of the first group of RIS's being configured based on the first configuration for enabling a respective signal path from the wireless node toward a first target area. In an aspect, operation 1110 may be performed by the one or more WWAN transceivers 310, the one or more short-range wireless transceivers 320, the one or more processors 332, memory 340, and/or sending component 342 in UE 302, or the one or more WWAN transceivers 350, the one or more short-range wireless transceivers 360, the one or more processors 384, memory 386, and/or sensing component 388 in base station 304, and any or all of which may be considered means for performing this operation. In one aspect, each one of the RIS's may correspond to RIS 700 in FIG. 7.

At 1120, the wireless node can transmit or receive a first plurality of signals, to or from the first target area, via the first group of RIS's in accordance with the first configuration. In an aspect, operation 1120 may be performed by the one or more WWAN transceivers 310, the one or more short-range wireless transceivers 320, the one or more processors 332, memory 340, and/or sending component 342 in UE 302, or the one or more WWAN transceivers 350, the one or more short-range wireless transceivers 360, the one or more processors 384, memory 386, and/or sensing component 388 in base station 304, and any or all of which may be considered means for performing this operation.

As will be appreciated, a technical advantage of the method 1100 is configurations for creating orthogonal signals for a MIMO radar sensing operation using a group of RIS's, such that the MIMO sensing can be enabled or improved without sacrificing the beam forming gain at the wireless node (e.g., a base station or a UE). The SINR can be improved by positioning the RIS closer to the target area. Also, multiple RIS's could enable spatial diversity gain to combat the radar cross section (RCS) fading and further enhance the sensing performance.

Figure 12A:
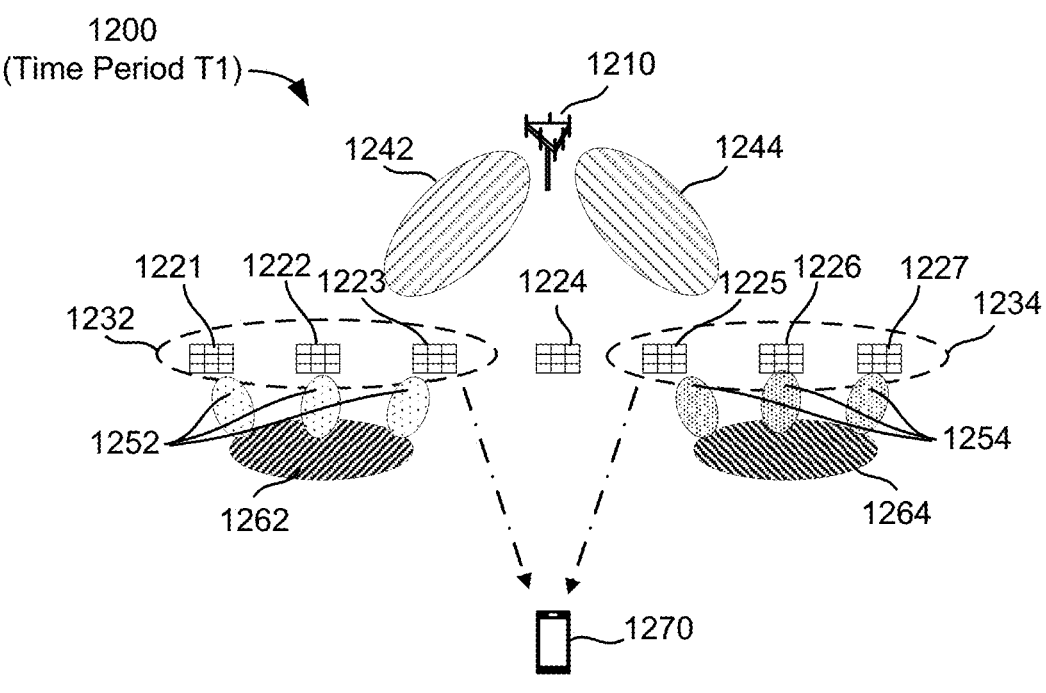
FIGS. 12A and 12B illustrate a MIMO radar system with RIS grouping for MIMO radar sensing, according to aspects of the disclosure.
Figure 12B:
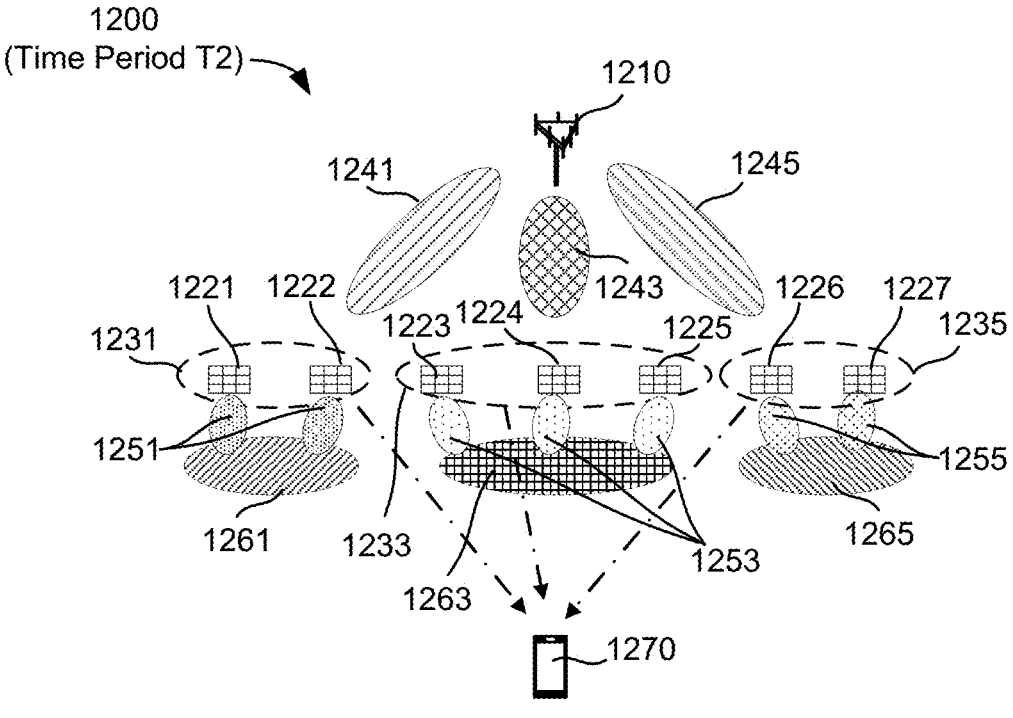

FIGS. 12A and 12B depict non-limiting examples of implementations based on method 1100.

FIGS. 12A and 12B illustrate a MIMO radar system 1200 with RIS grouping for MIMO radar sensing, according to aspects of the disclosure. FIG. 12A shows MIMO radar system 1200 in time period T1. MIMO radar system 1200 includes a wireless node 1210 (e.g., a base station or an eNB) and a plurality of RIS's 1221, 1222, 1223, 1224, 1225, 1226, and 1227. In time period T1, RIS's 1221, 1222, and 1223 can be configured to form a group of RIS's 1232, where RIS's 1221, 1222, and 1223 in group 1232 are configured to receive signals from wireless node 1210 via a beam 1242 and redirect the signals from the wireless node 1210 to a target area 1262 via beams 1252 formed by RIS's 1221, 1222, and 1223, respectively. The signals redirected by RIS's 1221, 1222, and 1223 toward target area 1262 can be used as sensing signals for performing a MIMO radar sensing operation on target area 1262. Also, in time period T1, RIS's 1225, 1226, and 1227 can be configured to form a group of RIS's 1234, where RIS's 1225, 1226, and 1227 in group 1234 are configured to receive signals from wireless node 1210 via a beam 1244 and redirect the signals from wireless node 1210 to a target area 1264 via beams 1254 formed by RIS's the RIS's 1225, 1226, and 1227, respectively. The signals redirected by RIS's 1225, 1226, and 1227 toward target area 1264 can be used as sensing signals for performing a MIMO radar sensing operation on target area 1264.

In an aspect, MIMO radar system 1200 can be configured to perform the MIMO radar sensing operation according to a multistatic radar scenario or a bistatic radar scenario. Accordingly, a returning signal that corresponds to an echo resulting from an interaction between the sensing signals via group 1232 and a target object in target area 1262 can be received by a radar signal receiver, such as another wireless node 1270 (e.g., a UE) depicted in FIG. 12A. Similarly, a returning signal that corresponds to an echo resulting from an interaction between the sensing signals via group 1234 and a target object in target area 1264 can be received by wireless node 1270.

In an aspect, the MIMO radar system 1200 can be configured to perform the MIMO radar sensing operation according to a monostatic radar scenario. Accordingly, a returning signal that corresponds to an echo resulting from an interaction between the sensing signals via group 1232 and a target object in target area 1262 can be received by wireless node 1210 along a returning path via beams 1252, group of RIS's 1221, 1222, and 1223, and beam 1242. Similarly, a returning signal that corresponds to an echo resulting from an interaction between the sensing signals via group 1234 and a target object in target area 1264 can be received by wireless node 1210 along a returning path via beams 1254, group of RIS's 1225, 1226, and 1227, and beam 1244.

In operation, wireless node 1210 can determine a first configuration associated with a first group of RIS's (e.g., group 1232 that includes RIS's 1221, 1222, and 1223). Each RIS of the first group can be configured based on the first configuration for enabling a respective signal path from wireless node 1210 toward a first target area (e.g., target area 1262). Wireless node 1210 can transmit or receive a first plurality of signals, to or from the target area, via the first group of RIS's in accordance with the first configuration associated with the first group of RIS's. In an aspect, wireless node 1210 can determine a second configuration associated with a second group of RIS's (e.g., group 1234 that includes RIS's 1225, 1226, and 1227). Each RIS of the second group can be configured based on the second configuration for enabling a respective signal path from wireless node 1210 toward a second target area (e.g., target area 1264). Wireless node 1210 can transmit or receive a second plurality of signals, to or from the second target area, via the second group of RIS's in accordance with the second configuration associated with the second group of RIS's. In an aspect, the first group of RIS's is different from the second group of RIS's, while in some implementations the first group of RIS's and the second group of RIS's can overlap. In an aspect, the first target area is different from the second target area, while in some implementations the first group of RIS's and the second group of RIS's can overlap.

In an aspect, wireless node 1210 can transmit, via each RIS of the first group of RIS's, a respective sensing signal for performing a multiple-input multiple-output (MIMO) radar sensing operation to the first target area based on the first configuration. In some implementations, the first group of RIS's can be configured to redirect respective sensing signals toward the first target area, and the sensing signals are distinguishable from one another by orthogonality thereof based on one or more of Time-Division Multiplexing (TDM), Frequency-Division Multiplexing (FDM), or Code-Division Multiplexing (CDM) in accordance with the first configuration.

In an aspect, the CDM corresponds to individual RIS's of the first group of RIS's being configured to incorporate different watermarks or orthogonal complementary codes embedded in corresponding signals, respectively. In an aspect, the TDM corresponds to wireless node 1210 transmitting signals toward the individual RIS's of the first group of RIS's at different time durations. In another aspect, the TDM corresponds to the individual RIS's of the first group of RIS's are set to form suitable signal paths between wireless node 1210 and target area 1262 at different time durations. In one implementation, the RIS's of the first group of RIS's can be scheduled to be used for the MIMO radar sensing operation closely in time (e.g., back-to-back configuration). In an aspect, the FDM corresponds to wireless node 1210 transmitting signals toward the individual RIS's of the first group of RIS's at different frequencies. In some implementations, orthogonality of the sensing signals can be achieved by adopting individual or any combination of CDM, TDM, and FDM. For example, even when TDM or FDM is used to distinguish different sensing signals, CDM can still be used to differentiate the reflection from the RIS's and the reflection from the environment.

In one aspect, wireless node 1210 can receive, via each RIS of the first group of RIS's, a respective returning signal in response to the respective sensing signal for performing the MIMO radar sensing operation from the first target area based on the first configuration. In such case, MIMO radar system 1200 is configured to perform the MIMO radar sensing operation according to a monostatic radar scenario. In one aspect, wireless node 1270 can receive, via each RIS of the first group of RIS's, a respective returning signal in response to the respective sensing signal for performing the MIMO radar sensing operation from the first target area based on the first configuration. In such case, the MIMO radar system 1200 is configured to perform the MIMO radar sensing operation according to a multistatic radar scenario or a bistatic radar scenario.

The operations based on the first group of RIS's 1232 were presented above as non-limiting examples. In some implementations, the second group of RIS's 1234 can be configured to perform a MIMO radar sensing operation on second target area 1264 in a manner similar to one or more examples described above with respect to the first group of RIS's 1232.

In one aspect, wireless node 1210 can transmit the first configuration associated with the first group of RIS's 1232 to at least wireless node 1270 that is configured to receive, via each RIS of the first group of RIS's 1232, a respective returning signal in response to the respective sensing signal for performing the MIMO radar sensing operation from target area 1262 based on the first configuration. In one aspect, wireless node 1210 can transmit the second configuration associated with the second group of RIS's 1234 to at least wireless node 1270 that is configured to receive, via each RIS of the second group of RIS's 1234, a respective returning signal in response to the respective sensing signal for performing the MIMO radar sensing operation from second target area 1264 based on the second configuration. The first configuration and the second configuration may include RIS IDs, timing, resource, beam coordination, RIS watermark information of the RIS's of a group. In some implementations, wireless node 1270 can process the received returning signals and forwarding the processing result to wireless node 1210. In some implementations, wireless node 1270 can simply forward the received returning signals to wireless node 1210 for processing based on the configuration information of the RIS group(s).

Moreover, FIG. 12B shows MIMO radar system 1200 in time period T2. As shown in FIGS. 12A and 12B, the grouping of the RIS's can be arranged in an adaptive manner. For example, the grouping of the RIS's in time period T2 can be different from that in time period T1, and different groups may be for different target areas.

As shown in FIG. 12B, in time period T2, RIS's 1221 and 1222 can be configured to form a group of RIS's 1231, where RIS's 1221 and 1222 in group 1231 are configured to receive signals from wireless node 1210 via a beam 1241 and redirect the signals from wireless node 1210 to a target area 1261 via beams 1251 formed by RIS's 1221 and 1222, respectively. The signals redirected by RIS's 1221 and 1222 toward target area 1261 can be used as sensing signals for performing a MIMO radar sensing operation on target area 1261. Similarly, in time period T2, RIS's 1223, 1224, and 1225 can be configured to form a group of RIS's 1233 to form signal paths between wireless node 1210 and a target area 1263 via a beam 1243 and beams 1253, and RIS's 1226 and 1227 can be configured to form a group of RIS's 1235 to form signal paths between wireless node 1210 and a target area 1265 via a beam 1245 and beams 1255.

In some implementations, beams 1241, 1243, and 1245 can be different from beams 1242 and 1244. In some implementations, target areas 1261, 1263, and 1265 can be different from target areas 1262 and 1264. In one aspect, wireless node 1210 can determine the grouping of RIS's and corresponding target areas in time period T2 based on the radar sensing results obtained in time period T1. In one aspect, MIMO radar system 1200 in time period T2 can be operated in a manner similar to MIMO radar system 1200 in time period T1 as described above.

In some aspects, the MIMO radar sensing operation performed by MIMO radar system 1200 can be a non-coherent MIMO radar sensing operation or a coherent MIMO radar sensing operation. In some aspects, the MIMO radar sensing operation performed by MIMO radar system 1200 can be based on a multistatic radar scenario or a bistatic radar scenario, and wireless node 1210 and wireless node 1270 can be one UE and one base station, two UEs, or two base stations. In at least one aspect, the MIMO radar sensing operation performed by MIMO radar system 1200 can be based on a monostatic radar scenario, wireless node 1270 may be omitted, and wireless node 1210 can be a UE or a base station.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a wireless node, comprising: determining a sub-panel configuration associated with a reconfigurable intelligence surface (RIS) that includes a plurality of sub-panels; and transmitting or receiving one or more signals via one or more sub-panels of the plurality of sub-panels in accordance with the sub-panel configuration.

Clause 2. The method of clause 1, wherein the transmitting or receiving the one or more signals comprises: transmitting, via a first sub-panel of the plurality of sub-panels, a first sensing signal for performing a multiple-input multiple-output (MIMO) radar sensing operation to a target area based on the sub-panel configuration.

Clause 3. The method of clause 2, wherein the transmitting or receiving the one or more signals comprises: transmitting, via a second sub-panel of the plurality of sub-panels, a second sensing signal for performing the MIMO radar sensing operation to the target area based on the sub-panel configuration.

Clause 4. The method of clause 3, wherein the first sensing signal is distinguishable from the second sensing signal by orthogonality thereof based on one or more of Time-Division Multiplexing (TDM), Frequency-Division Multiplexing (FDM), or Code-Division Multiplexing (CDM) in accordance with the sub-panel configuration.

Clause 5. The method of clause 4, wherein the CDM corresponds to the first sub-panel and the second sub-panel configured to incorporate different watermarks or orthogonal complementary codes embedded in the first sensing signal and the second sensing signal, respectively.

Clause 6. The method of clause 5, wherein the first sensing signal and the second sensing signal are obtained from a same source sensing signal transmitted by the wireless node.

Clause 7. The method of any of clauses 2 to 6, wherein the transmitting or receiving the one or more signals comprises: receiving, via the first sub-panel, a returning signal in response to the first sensing signal for performing the MIMO radar sensing operation from the target area based on the sub-panel configuration.

Clause 8. The method of any of clauses 2 to 6, wherein the transmitting or receiving the one or more signals comprises: receiving, via a third sub-panel of the plurality of sub-panels, a returning signal in response to the first sensing signal for performing the MIMO radar sensing operation from the target area based on the sub-panel configuration.

Clause 9. The method of clause 8, wherein: the first sub-panel and the third sub-panel are paired based on the sub-panel configuration, the first sub-panel is configured based on the sub-panel configuration to enable a signal path for transmission performed by the wireless node, and the third sub-panel is configured based on the sub-panel configuration to enable a signal path for reception performed by the wireless node.

Clause 10. The method of any of clauses 8 to 9, further comprising: identifying the received returning signal based on a watermark or an orthogonal complementary code associated with the third sub-panel embedded in the returning signal.

Clause 11. The method of clause 10, further comprising: identifying the received returning signal based on one other watermark or one other orthogonal complementary code associated with the first sub-panel embedded in the returning signal.

Clause 12. The method of clause 11, wherein: the watermark or the orthogonal complementary code associated with the third sub-panel includes an indicator indicating that the third sub-panel is configured to enable a signal path for reception performed by the wireless node, and the other watermark or the other orthogonal complementary code associated with the first sub-panel includes one other indicator indicating that the first sub-panel is configured to enable a signal path for transmission performed by the wireless node.

Clause 13. The method of any of clauses 8 to 12, wherein: the returning signal corresponds to an echo resulting from an interaction between the first sensing signal and a target object, and the method further comprises determining a position of the target object according to a reference ellipsoid defined by using positions of the first sub-panel and the third sub-panel as anchors of the reference ellipsoid.

Clause 14. The method of clause 13, further comprising: determining a summation $R_{sum}$ of a first distance $R_1$ and a second distance $R_2$ according to an equation of $R_{sum}=R_1+R_2=(T_{Rx}-T_{TxLOS})*c-(L_1-L_2)$, $R_1$ representing the first distance between the target object and the first sub-panel, $R_2$ representing the second distance between the target object and the third sub-panel, $L_1$ representing a third distance between the wireless node and the first sub-panel, $L_2$ representing a fourth distance between the wireless node and the third sub-panel, c representing a propagation speed of electromagnetic waves, $T_{TxLOS}$ representing a first time that the wireless node transmits the first sensing signal, and $T_{Rx}$ representing a second time that the wireless node receives the returning signal; and determining the position of the target object according to the summation $R_{sum}$ of the first distance $R_1$ and the second distance $R_2$.

Clause 15. The method of any of clauses 7 to 14, wherein: the MIMO radar sensing operation is a coherent MIMO radar sensing operation, and the wireless node is a user equipment (UE) or a base station.

Clause 16. A method of operating a wireless node, comprising: determining a first configuration associated with a first group of reconfigurable intelligence surfaces (RIS's), each RIS of the first group of RIS's being configured based on the first configuration for enabling a respective signal path from the wireless node toward a first target area; and transmitting or receiving a first plurality of signals, to or from the first target area, via the first group of RIS's in accordance with the first configuration.

Clause 17. The method of clause 16, further comprising: determining a second configuration associated with a second group of RIS's, each RIS of the second group of RIS's being configured based on the second configuration for enabling a respective signal path from the wireless node toward a second target area; and transmitting or receiving a second plurality of signals, to or from the second target area, via the second group of RIS's in accordance with the second configuration, wherein: the first group of RIS's is different from the second group of RIS's, and the first target area is different from the second target area.

Clause 18. The method of any of clauses 16 to 17, wherein the first group of RIS's is configured to redirect sensing signals toward the first target area, and the sensing signals are distinguishable from one another by orthogonality thereof based on one or more of Time-Division Multiplexing (TDM), Frequency-Division Multiplexing (FDM), or Code-Division Multiplexing (CDM) in accordance with the first configuration.

Clause 19. The method of clause 18, wherein the CDM corresponds to individual RIS's of the first group of RIS's being configured to incorporate different watermarks or orthogonal complementary codes embedded in corresponding signals, respectively.

Clause 20. The method of any of clauses 16 to 19, wherein the transmitting or receiving the first plurality of signals comprises: transmitting, via each RIS of the first group of RIS's, a respective sensing signal for performing a multiple-input multiple-output (MIMO) radar sensing operation to the first target area based on the first configuration.

Clause 21. The method of clause 20, wherein the transmitting or receiving the first plurality of signals comprises: receiving, via each RIS of the first group of RIS's, a respective returning signal in response to the respective sensing signal for performing the MIMO radar sensing operation from the first target area based on the first configuration.

Clause 22. The method of any of clauses 20 to 21, further comprising: transmitting, by the wireless node to at least one other wireless node, the first configuration associated with the first group of RIS's, the at least one other wireless node being configured to receive, via each RIS of the first group of RIS's, a respective returning signal in response to the respective sensing signal for performing the MIMO radar sensing operation from the first target area based on the first configuration.

Clause 23. The method of clause 22, wherein: the MIMO radar sensing operation is a non-coherent MIMO radar sensing operation, and the wireless node and the at least one other wireless node are one user equipment (UE) and one base station, two UEs, or two base stations.

Clause 24. A wireless node, comprising: a memory; at least one transceiver; and at least one processor communicatively coupled to the memory and the at least one transceiver, the at least one processor configured to: determine a sub-panel configuration associated with a reconfigurable intelligence surface (RIS) that includes a plurality of sub-panels; and transmit or receive, via the at least one transceiver, one or more signals via one or more sub-panels of the plurality of sub-panels in accordance with the sub-panel configuration.

Clause 25. The wireless node of clause 24, wherein the at least one processor is configured to: transmit, via the at least one transceiver and via a first sub-panel of the plurality of sub-panels, a first sensing signal for performing a multiple-input multiple-output (MIMO) radar sensing operation to a target area based on the sub-panel configuration.

Clause 26. The wireless node of clause 25, wherein the at least one processor is configured to: transmit, via the at least one transceiver and via a second sub-panel of the plurality of sub-panels, a second sensing signal for performing the MIMO radar sensing operation to the target area based on the sub-panel configuration.

Clause 27. The wireless node of clause 26, wherein the first sensing signal is distinguishable from the second sensing signal by orthogonality thereof based on one or more of Time-Division Multiplexing (TDM), Frequency-Division Multiplexing (FDM), or Code-Division Multiplexing (CDM) in accordance with the sub-panel configuration.

Clause 28. The wireless node of clause 27, wherein the CDM corresponds to the first sub-panel and the second sub-panel configured to incorporate different watermarks or orthogonal complementary codes embedded in the first sensing signal and the second sensing signal, respectively.

Clause 29. The wireless node of clause 28, wherein the first sensing signal and the second sensing signal are obtained from a same source sensing signal transmitted by the wireless node.

Clause 30. The wireless node of any of clauses 25 to 29, wherein the at least one processor is configured to: receive, via the at least one transceiver and via the first sub-panel, a returning signal in response to the first sensing signal for performing the MIMO radar sensing operation from the target area based on the sub-panel configuration.

Clause 31. The wireless node of any of clauses 25 to 29, wherein the at least one processor is configured to: receive, via the at least one transceiver and via a third sub-panel of the plurality of sub-panels, a returning signal in response to the first sensing signal for performing the MIMO radar sensing operation from the target area based on the sub-panel configuration.

Clause 32. The wireless node of clause 31, wherein: the first sub-panel and the third sub-panel are paired based on the sub-panel configuration, the first sub-panel is configured based on the sub-panel configuration to enable a signal path for transmission performed by the wireless node, and the third sub-panel is configured based on the sub-panel configuration to enable a signal path for reception performed by the wireless node.

Clause 33. The wireless node of any of clauses 31 to 32, wherein the at least one processor is further configured to: identify the received returning signal based on a watermark or an orthogonal complementary code associated with the third sub-panel embedded in the returning signal.

Clause 34. The wireless node of clause 33, wherein the at least one processor is further configured to: identify the received returning signal based on one other watermark or one other orthogonal complementary code associated with the first sub-panel embedded in the returning signal.

Clause 35. The wireless node of clause 34, wherein: the watermark or the orthogonal complementary code associated with the third sub-panel includes an indicator indicating that the third sub-panel is configured to enable a signal path for reception performed by the wireless node, and the other watermark or the other orthogonal complementary code associated with the first sub-panel includes one other indicator indicating that the first sub-panel is configured to enable a signal path for transmission performed by the wireless node.

Clause 36. The wireless node of any of clauses 31 to 35, wherein: the returning signal corresponds to an echo resulting from an interaction between the first sensing signal and a target object, and the at least one processor is configured to determine a position of the target object according to a reference ellipsoid defined by using positions of the first sub-panel and the third sub-panel as anchors of the reference ellipsoid.

Clause 37. The wireless node of clause 36, wherein the at least one processor is further configured to: determine a summation $R_{sum}$ of a first distance $R_1$ and a second distance $R_2$ according to an equation of $R_{sum} = R_1 + R_2 = (T_{Rx} - T_{TxLOS}) * c - (L_1 - L_2)$, $R_1$ representing the first distance between the target object and the first sub-panel, $R_2$ representing the second distance between the target object and the third sub-panel, $L_1$ representing a third distance between the wireless node and the first sub-panel, $L_2$ representing a fourth distance between the wireless node and the third sub-panel, c representing a propagation speed of electromagnetic waves, $T_{TxLos}$ representing a first time that the wireless node transmits the first sensing signal, and $T_{Rx}$ representing a second time that the wireless node receives the returning signal; and determine the position of the target object according to the summation $R_{sum}$ of the first distance $R_1$ and the second distance $R_2$.

Clause 38. The wireless node of any of clauses 30 to 37, wherein: the MIMO radar sensing operation is a coherent MIMO radar sensing operation, and the wireless node is a user equipment (UE) or a base station.

Clause 39. A wireless node, comprising: a memory; at least one transceiver; and at least one processor communicatively coupled to the memory and the at least one trans-ceiver, the at least one processor configured to: determine a first configuration associated with a first group of reconfigurable intelligence surfaces (RIS's), each RIS of the first group of RIS's being configured based on the first configuration for enabling a respective signal path from the wireless node toward a first target area; and transmit or receive, via the at least one transceiver, a first plurality of signals, to or from the first target area, via the first group of RIS's in accordance with the first configuration.

Clause 40. The wireless node of clause 39, wherein the at least one processor is further configured to: determine a second configuration associated with a second group of RIS's, each RIS of the second group of RIS's being configured based on the second configuration for enabling a respective signal path from the wireless node toward a second target area; and transmit or receive, via the at least one transceiver, a second plurality of signals, to or from the second target area, via the second group of RIS's in accordance with the second configuration, wherein: the first group of RIS's is different from the second group of RIS's, and the first target area is different from the second target area.

Clause 41. The wireless node of any of clauses 39 to 40, wherein the first group of RIS's is configured to redirect sensing signals toward the first target area, and the sensing signals are distinguishable from one another by orthogonality thereof based on one or more of Time-Division Multiplexing (TDM), Frequency-Division Multiplexing (FDM), or Code-Division Multiplexing (CDM) in accordance with the first configuration.

Clause 42. The wireless node of clause 41, wherein the CDM corresponds to individual RIS's of the first group of RIS's being configured to incorporate different watermarks or orthogonal complementary codes embedded in corresponding signals, respectively.

Clause 43. The wireless node of any of clauses 39 to 42, wherein the at least one processor is configured to: transmit, via the at least one transceiver and via each RIS of the first group of RIS's, a respective sensing signal for performing a multiple-input multiple-output (MIMO) radar sensing operation to the first target area based on the first configuration.

Clause 44. The wireless node of clause 43, wherein the at least one processor is configured to: receive, via the at least one transceiver and via each RIS of the first group of RIS's, a respective returning signal in response to the respective sensing signal for performing the MIMO radar sensing operation from the first target area based on the first configuration.

Clause 45. The wireless node of any of clauses 43 to 44, wherein the at least one processor is further configured to: transmit, via the at least one transceiver to at least one other wireless node, the first configuration associated with the first group of RIS's, the at least one other wireless node being configured to receive, via each RIS of the first group of RIS's, a respective returning signal in response to the respective sensing signal for performing the MIMO radar sensing operation from the first target area based on the first configuration.

Clause 46. The wireless node of clause 45, wherein: the MIMO radar sensing operation is a non-coherent MIMO radar sensing operation, and the wireless node and the at least one other wireless node are one user equipment (UE) and one base station, two UEs, or two base stations.

Clause 47. A wireless node, comprising: means for determining a sub-panel configuration associated with a reconfigurable intelligence surface (RIS) that includes a plurality of sub-panels; and means for transmitting or receiving one or more signals via one or more sub-panels of the plurality of sub-panels in accordance with the sub-panel configuration.

Clause 48. The wireless node of clause 47, wherein the means for transmitting or receiving the one or more signals comprises: means for transmitting, via a first sub-panel of the plurality of sub-panels, a first sensing signal for performing a multiple-input multiple-output (MIMO) radar sensing operation to a target area based on the sub-panel configuration.

Clause 49. The wireless node of clause 48, wherein the means for transmitting or receiving the one or more signals comprises: means for transmitting, via a second sub-panel of the plurality of sub-panels, a second sensing signal for performing the MIMO radar sensing operation to the target area based on the sub-panel configuration.

Clause 50. The wireless node of clause 49, wherein the first sensing signal is distinguishable from the second sensing signal by orthogonality thereof based on one or more of Time-Division Multiplexing (TDM), Frequency-Division Multiplexing (FDM), or Code-Division Multiplexing (CDM) in accordance with the sub-panel configuration.

Clause 51. The wireless node of clause 50, wherein the CDM corresponds to the first sub-panel and the second sub-panel configured to incorporate different watermarks or orthogonal complementary codes embedded in the first sensing signal and the second sensing signal, respectively.

Clause 52. The wireless node of clause 51, wherein the first sensing signal and the second sensing signal are obtained from a same source sensing signal transmitted by the wireless node.

Clause 53. The wireless node of any of clauses 48 to 52, wherein the means for transmitting or receiving the one or more signals comprises: means for receiving, via the first sub-panel, a returning signal in response to the first sensing signal for performing the MIMO radar sensing operation from the target area based on the sub-panel configuration.

Clause 54. The wireless node of any of clauses 48 to 52, wherein the means for transmitting or receiving the one or more signals comprises: means for receiving, via a third sub-panel of the plurality of sub-panels, a returning signal in response to the first sensing signal for performing the MIMO radar sensing operation from the target area based on the sub-panel configuration.

Clause 55. The wireless node of clause 54, wherein: the first sub-panel and the third sub-panel are paired based on the sub-panel configuration, the first sub-panel is configured based on the sub-panel configuration to enable a signal path for transmission performed by the wireless node, and the third sub-panel is configured based on the sub-panel configuration to enable a signal path for reception performed by the wireless node.

Clause 56. The wireless node of any of clauses 43 to 55, further comprising: means for identifying the received returning signal based on a watermark or an orthogonal complementary code associated with the third sub-panel embedded in the returning signal.

Clause 57. The wireless node of clause 56, further comprising: means for identifying the received returning signal based on one other watermark or one other orthogonal complementary code associated with the first sub-panel embedded in the returning signal.

Clause 58. The wireless node of clause 57, wherein: the watermark or the orthogonal complementary code associated with the third sub-panel includes an indicator indicating that the third sub-panel is configured to enable a signal path for reception performed by the wireless node, and the other watermark or the other orthogonal complementary code associated with the first sub-panel includes one other indicator indicating that the first sub-panel is configured to enable a signal path for transmission performed by the wireless node.

Clause 59. The wireless node of any of clauses 54 to 58, wherein: the returning signal corresponds to an echo resulting from an interaction between the first sensing signal and a target object, and the wireless node further comprises means for determining a position of the target object according to a reference ellipsoid defined by using positions of the first sub-panel and the third sub-panel as anchors of the reference ellipsoid.

Clause 60. The wireless node of clause 59, further comprising: means for determining a summation $R_{sum}$ of a first distance $R_1$ and a second distance $R_2$ according to an equation of $R_{sum}=R_1+R_2=(T_{Rx}-T_{TxLOS})*c-(L_1-L_2)$, $R_1$ representing the first distance between the target object and the first sub-panel, $R_2$ representing the second distance between the target object and the third sub-panel, $L_1$ representing a third distance between the wireless node and the first sub-panel, $L_2$ representing a fourth distance between the wireless node and the third sub-panel, c representing a propagation speed of electromagnetic waves, $T_{TxLos}$ representing a first time that the wireless node transmits the first sensing signal, and $T_{Rx}$ representing a second time that the wireless node receives the returning signal; and means for determining the position of the target object according to the summation $R_{sum}$ of the first distance $R_1$ and the second distance $R_2$.

Clause 61. The wireless node of any of clauses 53 to 60, wherein: the MIMO radar sensing operation is a coherent MIMO radar sensing operation, and the wireless node is a user equipment (UE) or a base station.

Clause 62. A wireless node, comprising: means for determining a first configuration associated with a first group of reconfigurable intelligence surfaces (RIS's), each RIS of the first group of RIS's being configured based on the first configuration for enabling a respective signal path from the wireless node toward a first target area; and means for transmitting or receiving a first plurality of signals, to or from the first target area, via the first group of RIS's in accordance with the first configuration.

Clause 63. The wireless node of clause 62, further comprising: means for determining a second configuration associated with a second group of RIS's, each RIS of the second group of RIS's being configured based on the second configuration for enabling a respective signal path from the wireless node toward a second target area; and means for transmitting or receiving a second plurality of signals, to or from the second target area, via the second group of RIS's in accordance with the second configuration, wherein: the first group of RIS's is different from the second group of RIS's, and the first target area is different from the second target area.

Clause 64. The wireless node of any of clauses 62 to 63, wherein the first group of RIS's is configured to redirect sensing signals toward the first target area, and the sensing signals are distinguishable from one another by orthogonality thereof based on one or more of Time-Division Multiplexing (TDM), Frequency-Division Multiplexing (FDM), or Code-Division Multiplexing (CDM) in accordance with the first configuration.

Clause 65. The wireless node of clause 64, wherein the CDM corresponds to individual RIS's of the first group of RIS's being configured to incorporate different watermarks or orthogonal complementary codes embedded in corresponding signals, respectively.

Clause 66. The wireless node of any of clauses 62 to 65, wherein the means for transmitting or receiving the first plurality of signals comprises: means for transmitting, via each RIS of the first group of RIS's, a respective sensing signal for performing a multiple-input multiple-output (MIMO) radar sensing operation to the first target area based on the first configuration.

Clause 67. The wireless node of clause 66, wherein the means for transmitting or receiving the first plurality of signals comprises: means for receiving, via each RIS of the first group of RIS's, a respective returning signal in response to the respective sensing signal for performing the MIMO radar sensing operation from the first target area based on the first configuration.

Clause 68. The wireless node of any of clauses 66 to 67, further comprising: means for transmitting, to at least one other wireless node, the first configuration associated with the first group of RIS's, the at least one other wireless node being configured to receive, via each RIS of the first group of RIS's, a respective returning signal in response to the respective sensing signal for performing the MIMO radar sensing operation from the first target area based on the first configuration.

Clause 69. The wireless node of clause 68, wherein: the MIMO radar sensing operation is a non-coherent MIMO radar sensing operation, and the wireless node and the at least one other wireless node are one user equipment (UE) and one base station, two UEs, or two base stations.

Clause 70. A non-transitory computer-readable medium storing computer-executable instructions that, when executed by a wireless node, cause the wireless node to: determine a sub-panel configuration associated with a reconfigurable intelligence surface (RIS) that includes a plurality of sub-panels; and transmit or receive one or more signals via one or more sub-panels of the plurality of sub-panels in accordance with the sub-panel configuration.

Clause 71. The non-transitory computer-readable medium of clause 70, wherein the computer-executable instructions that, when executed by the wireless node, cause the wireless node to: transmit, via a first sub-panel of the plurality of sub-panels, a first sensing signal for performing a multiple-input multiple-output (MIMO) radar sensing operation to a target area based on the sub-panel configuration.

Clause 72. The non-transitory computer-readable medium of clause 71, wherein the computer-executable instructions that, when executed by the wireless node, cause the wireless node to: transmit, via a second sub-panel of the plurality of sub-panels, a second sensing signal for performing the MIMO radar sensing operation to the target area based on the sub-panel configuration.

Clause 73. The non-transitory computer-readable medium of clause 72, wherein the first sensing signal is distinguishable from the second sensing signal by orthogonality thereof based on one or more of Time-Division Multiplexing (TDM), Frequency-Division Multiplexing (FDM), or Code-Division Multiplexing (CDM) in accordance with the sub-panel configuration.

Clause 74. The non-transitory computer-readable medium of clause 73, wherein the CDM corresponds to the first sub-panel and the second sub-panel configured to incorporate different watermarks or orthogonal complementary codes embedded in the first sensing signal and the second sensing signal, respectively.

Clause 75. The non-transitory computer-readable medium of clause 74, wherein the first sensing signal and the second sensing signal are obtained from a same source sensing signal transmitted by the wireless node.

Clause 76. The non-transitory computer-readable medium of any of clauses 71 to 75, wherein the computer-executable instructions that, when executed by the wireless node, cause the wireless node to: receive, via the first sub-panel, a returning signal in response to the first sensing signal for performing the MIMO radar sensing operation from the target area based on the sub-panel configuration.

Clause 77. The non-transitory computer-readable medium of any of clauses 71 to 75, wherein the computer-executable instructions that, when executed by the wireless node, cause the wireless node to: receive, via a third sub-panel of the plurality of sub-panels, a returning signal in response to the first sensing signal for performing the MIMO radar sensing operation from the target area based on the sub-panel configuration.

Clause 78. The non-transitory computer-readable medium of clause 77, wherein: the first sub-panel and the third sub-panel are paired based on the sub-panel configuration, the first sub-panel is configured based on the sub-panel configuration to enable a signal path for transmission performed by the wireless node, and the third sub-panel is configured based on the sub-panel configuration to enable a signal path for reception performed by the wireless node.

Clause 79. The non-transitory computer-readable medium of any of clauses 77 to 78, wherein the computer-executable instructions that, when executed by the wireless node, cause the wireless node to: identify the received returning signal based on a watermark or an orthogonal complementary code associated with the third sub-panel embedded in the returning signal.

Clause 80. The non-transitory computer-readable medium of clause 79, wherein the computer-executable instructions that, when executed by the wireless node, cause the wireless node to: identify the received returning signal based on one other watermark or one other orthogonal complementary code associated with the first sub-panel embedded in the returning signal.

Clause 81. The non-transitory computer-readable medium of clause 80, wherein: the watermark or the orthogonal complementary code associated with the third sub-panel includes an indicator indicating that the third sub-panel is configured to enable a signal path for reception performed by the wireless node, and the other watermark or the other orthogonal complementary code associated with the first sub-panel includes one other indicator indicating that the first sub-panel is configured to enable a signal path for transmission performed by the wireless node.

Clause 82. The non-transitory computer-readable medium of any of clauses 77 to 81, wherein: the returning signal corresponds to an echo resulting from an interaction between the first sensing signal and a target object, and the computer-executable instructions that, when executed by the wireless node, cause the wireless node to determine a position of the target object according to a reference ellipsoid defined by using positions of the first sub-panel and the third sub-panel as anchors of the reference ellipsoid.

Clause 83. The non-transitory computer-readable medium of clause 82, wherein the computer-executable instructions that, when executed by the wireless node, cause the wireless node to: determine a summation $R_{sum}$ of a first distance $R_1$ and a second distance $R_2$ according to an equation of $R_{sum}=R_1+R_2=(T_{Rx}-T_{TxLOS})*c-(L_1-L_2)$, $R_1$ representing the first distance between the target object and the first sub-panel, $R_2$ representing the second distance between the target object and the third sub-panel, $L_1$ representing a third distance between the wireless node and the first sub-panel, $L_2$ representing a fourth distance between the wireless node and the third sub-panel, c representing a propagation speed of electromagnetic waves, $T_{TxLos}$ representing a first time that the wireless node transmits the first sensing signal, and $T_{Rx}$ representing a second time that the wireless node receives the returning signal; and determine the position of the target object according to the summation $R_{sum}$ of the first distance $R_1$ and the second distance $R_2$.

Clause 84. The non-transitory computer-readable medium of any of clauses 76 to 83, wherein: the MIMO radar sensing operation is a coherent MIMO radar sensing operation, and the wireless node is a user equipment (UE) or a base station.

Clause 85. A non-transitory computer-readable medium storing computer-executable instructions that, when executed by a wireless node, cause the wireless node to: determine a first configuration associated with a first group of reconfigurable intelligence surfaces (RIS's), each RIS of the first group of RIS's being configured based on the first configuration for enabling a respective signal path from the wireless node toward a first target area; and transmit or receiving a first plurality of signals, to or from the first target area, via the first group of RIS's in accordance with the first configuration.

Clause 86. The non-transitory computer-readable medium of clause 85, wherein the computer-executable instructions, when executed by the wireless node, cause the wireless node to: determine a second configuration associated with a second group of RIS's, each RIS of the second group of RIS's being configured based on the second configuration for enabling a respective signal path from the wireless node toward a second target area; and transmit or receiving a second plurality of signals, to or from the second target area, via the second group of RIS's in accordance with the second configuration, wherein: the first group of RIS's is different from the second group of RIS's, and the first target area is different from the second target area.

Clause 87. The non-transitory computer-readable medium of any of clauses 85 to 86, wherein the first group of RIS's is configured to redirect sensing signals toward the first target area, and the sensing signals are distinguishable from one another by orthogonality thereof based on one or more of Time-Division Multiplexing (TDM), Frequency-Division Multiplexing (FDM), or Code-Division Multiplexing (CDM) in accordance with the first configuration.

Clause 88. The non-transitory computer-readable medium of clause 87, wherein the CDM corresponds to individual RIS's of the first group of RIS's being configured to incorporate different watermarks or orthogonal complementary codes embedded in corresponding signals, respectively.

Clause 89. The non-transitory computer-readable medium of any of clauses 85 to 88, wherein the computer-executable instructions, when executed by the wireless node, cause the wireless node to: transmit, via each RIS of the first group of RIS's, a respective sensing signal for performing a multiple-input multiple-output (MIMO) radar sensing operation to the first target area based on the first configuration.

Clause 90. The non-transitory computer-readable medium of clause 89, wherein the computer-executable instructions, when executed by the wireless node, cause the wireless node to: receive, via each RIS of the first group of RIS's, a respective returning signal in response to the respective sensing signal for performing the MIMO radar sensing operation from the first target area based on the first configuration.

Clause 91. The non-transitory computer-readable medium of any of clauses 89 to 90, wherein the computer-executable instructions, when executed by the wireless node, cause the wireless node to: transmit, to at least one other wireless node, the first configuration associated with the first group of RIS's, the at least one other wireless node being configured to receive, via each RIS of the first group of RIS's, a respective returning signal in response to the respective sensing signal for performing the MIMO radar sensing operation from the first target area based on the first configuration.

Clause 92. The non-transitory computer-readable medium of clause 91, wherein: the MIMO radar sensing operation is a non-coherent MIMO radar sensing operation, and the wireless node and the at least one other wireless node are one user equipment (UE) and one base station, two UEs, or two base stations.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC.

The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a wireless node, comprising:
determining a first configuration associated with a first group of reconfigurable intelligence surfaces (RIS's), each RIS of the first group of RIS's being configured based on the first configuration for enabling a respective signal path from the wireless node toward a first target area; and
transmitting or receiving a first plurality of signals, to or from the first target area, via the first group of RIS's in accordance with the first configuration.

2. The method of claim 1, further comprising:
determining a second configuration associated with a second group of RIS's, each RIS of the second group of RIS's being configured based on the second configuration for enabling a respective signal path from the wireless node toward a second target area; and
transmitting or receiving a second plurality of signals, to or from the second target area, via the second group of RIS's in accordance with the second configuration, wherein:

the first group of RIS's is different from the second group of RIS's, and
the first target area is different from the second target area.

3. The method of claim 1, wherein the first group of RIS's is configured to redirect sensing signals toward the first target area, and the sensing signals are distinguishable from one another by orthogonality thereof based on one or more of Time-Division Multiplexing (TDM), Frequency-Division Multiplexing (FDM), or Code-Division Multiplexing (CDM) in accordance with the first configuration.

4. The method of claim 3, wherein the CDM corresponds to individual RIS's of the first group of RIS's being configured to incorporate different watermarks or orthogonal complementary codes embedded in corresponding signals, respectively.

5. The method of claim 1, wherein the transmitting or receiving the first plurality of signals comprises:
transmitting, via each RIS of the first group of RIS's, a respective sensing signal for performing a multiple-input multiple-output (MIMO) radar sensing operation to the first target area based on the first configuration.

6. The method of claim 5, wherein the transmitting or receiving the first plurality of signals comprises:
receiving, via each RIS of the first group of RIS's, a respective returning signal in response to the respective sensing signal for performing the MIMO radar sensing operation from the first target area based on the first configuration.

7. The method of claim 5, further comprising:
transmitting, by the wireless node to at least one other wireless node, the first configuration associated with the first group of RIS's, the at least one other wireless node being configured to receive, via each RIS of the first group of RIS's, a respective returning signal in response to the respective sensing signal for performing the MIMO radar sensing operation from the first target area based on the first configuration.

8. The method of claim 7, wherein:
the MIMO radar sensing operation is a non-coherent MIMO radar sensing operation, and
the wireless node and the at least one other wireless node are one user equipment (UE) and one base station, two UEs, or two base stations.

9. A wireless node, comprising:
a memory;
at least one transceiver; and
at least one processor communicatively coupled to the memory and the at least one transceiver, the at least one processor configured to:
determine a first configuration associated with a first group of reconfigurable intelligence surfaces (RIS's), each RIS of the first group of RIS's being configured based on the first configuration for enabling a respective signal path from the wireless node toward a first target area; and
transmit or receive, via the at least one transceiver, a first plurality of signals, to or from the first target area, via the first group of RIS's in accordance with the first configuration.

10. The wireless node of claim 9, wherein the at least one processor is further configured to:
determine a second configuration associated with a second group of RIS's, each RIS of the second group of RIS's being configured based on the second configuration for enabling a respective signal path from the wireless node toward a second target area; and
transmit or receive, via the at least one transceiver, a second plurality of signals, to or from the second target area, via the second group of RIS's in accordance with the second configuration, wherein:

the first group of RIS's is different from the second group of RIS's, and the first target area is different from the second target area.

11. The wireless node of claim 9, wherein the first group of RIS's is configured to redirect sensing signals toward the first target area, and the sensing signals are distinguishable from one another by orthogonality thereof based on one or more of Time-Division Multiplexing (TDM), Frequency-Division Multiplexing (FDM), or Code-Division Multiplexing (CDM) in accordance with the first configuration.

12. The wireless node of claim 11, wherein the CDM corresponds to individual RIS's of the first group of RIS's being configured to incorporate different watermarks or orthogonal complementary codes embedded in corresponding signals, respectively.

13. The wireless node of claim 9, wherein the at least one processor is configured to:

transmit, via the at least one transceiver and via each RIS of the first group of RIS's, a respective sensing signal for performing a multiple-input multiple-output (MIMO) radar sensing operation to the first target area based on the first configuration.

14. The wireless node of claim 13, wherein the at least one processor is configured to:

receive, via the at least one transceiver and via each RIS of the first group of RIS's, a respective returning signal in response to the respective sensing signal for performing the MIMO radar sensing operation from the first target area based on the first configuration.

15. The wireless node of claim 13, wherein the at least one processor is further configured to:

transmit, via the at least one transceiver to at least one other wireless node, the first configuration associated with the first group of RIS's, the at least one other wireless node being configured to receive, via each RIS of the first group of RIS's, a respective returning signal in response to the respective sensing signal for performing the MIMO radar sensing operation from the first target area based on the first configuration.

16. The wireless node of claim 15, wherein:

the MIMO radar sensing operation is a non-coherent MIMO radar sensing operation, and the wireless node and the at least one other wireless node are one user equipment (UE) and one base station, two UEs, or two base stations.

17. A non-transitory computer-readable medium storing computer-executable instructions that, when executed by a wireless node, cause the wireless node to:

determine a first configuration associated with a first group of reconfigurable intelligence surfaces (RIS's), each RIS of the first group of RIS's being configured based on the first configuration for enabling a respective signal path from the wireless node toward a first target area; and transmit or receive a first plurality of signals, to or from the first target area, via the first group of RIS's in accordance with the first configuration.

18. The non-transitory computer-readable medium of claim 17, wherein the computer-executable instructions, when executed by the wireless node, cause the wireless node to:

determine a second configuration associated with a second group of RIS's, each RIS of the second group of RIS's being configured based on the second configuration for enabling a respective signal path from the wireless node toward a second target area; and transmit or receive a second plurality of signals, to or from the second target area, via the second group of RIS's in accordance with the second configuration, wherein:

the first group of RIS's is different from the second group of RIS's, and the first target area is different from the second target area.

19. The non-transitory computer-readable medium of claim 17, wherein the computer-executable instructions, when executed by the wireless node, cause the wireless node to:

transmit, via each RIS of the first group of RIS's, a respective sensing signal for performing a multiple-input multiple-output (MIMO) radar sensing operation to the first target area based on the first configuration.

20. The non-transitory computer-readable medium of claim 19, wherein the computer-executable instructions, when executed by the wireless node, cause the wireless node to:

receive, via each RIS of the first group of RIS's, a respective returning signal in response to the respective sensing signal for performing the MIMO radar sensing operation from the first target area based on the first configuration; or transmit, to at least one other wireless node, the first configuration associated with the first group of RIS's, the at least one other wireless node being configured to receive, via each RIS of the first group of RIS's, a respective returning signal in response to the respective sensing signal for performing the MIMO radar sensing operation from the first target area based on the first configuration.

* * * * *